(12) United States Patent
Wohlert et al.

(10) Patent No.: US 8,799,495 B2
(45) Date of Patent: Aug. 5, 2014

(54) MULTIPLE DEVICES MULTIMEDIA CONTROL

(75) Inventors: Randolph Wohlert, Austin, TX (US); Kaniz Mahdi, Carrollton, TX (US)

(73) Assignees: AT&T Intellectual Property I, LP, Atlanta, GA (US); FutureWei Technologies, Inc., Plano, TX (US)

( * ) Notice: Subject to any disclaimer, the term of this patent is extended or adjusted under 35 U.S.C. 154(b) by 475 days.

(21) Appl. No.: 12/336,881

(22) Filed: Dec. 17, 2008

(65) Prior Publication Data

US 2010/0153576 A1 Jun. 17, 2010

(51) Int. Cl.
*G06F 15/16* (2006.01)
*H04J 3/18* (2006.01)
*H04B 15/00* (2006.01)

(52) U.S. Cl.
USPC ............................. 709/231; 370/477; 455/502

(58) Field of Classification Search
USPC .......................................................... 709/231
See application file for complete search history.

(56) References Cited

U.S. PATENT DOCUMENTS

| | | | | |
|---|---|---|---|---|
| 5,889,772 A * | 3/1999 | Fischer et al. | ................. | 370/346 |
| 6,857,130 B2 * | 2/2005 | Srikantan et al. | ................ | 725/93 |
| 7,447,172 B2 * | 11/2008 | Matsumoto | ..................... | 370/324 |
| 7,546,118 B2 * | 6/2009 | Camp, Jr. | ..................... | 455/418 |
| 7,617,278 B1 * | 11/2009 | Edelman et al. | .............. | 709/204 |
| 7,920,562 B2 * | 4/2011 | Patel | ............................. | 370/390 |
| 7,966,078 B2 * | 6/2011 | Hoffberg et al. | ................. | 700/17 |
| 8,010,690 B2 * | 8/2011 | Finger et al. | ................... | 709/231 |
| 8,316,154 B2 * | 11/2012 | Yoneda | ........................ | 709/248 |
| 8,321,534 B1 * | 11/2012 | Roskind et al. | ............... | 709/220 |
| 2002/0065918 A1 * | 5/2002 | Shastri | ........................ | 709/226 |
| 2002/0065926 A1 * | 5/2002 | Hackney et al. | .............. | 709/231 |
| 2002/0078220 A1 * | 6/2002 | Ryan | ............................. | 709/231 |
| 2002/0099842 A1 * | 7/2002 | Jennings et al. | .............. | 709/231 |
| 2002/0124100 A1 * | 9/2002 | Adams | ........................ | 709/232 |
| 2002/0164155 A1 * | 11/2002 | Mate | ............................... | 386/96 |
| 2003/0200336 A1 * | 10/2003 | Pal et al. | ....................... | 709/246 |
| 2004/0064504 A1 * | 4/2004 | Domschitz | ................... | 709/203 |
| 2006/0002681 A1 * | 1/2006 | Spilo et al. | ..................... | 386/46 |
| 2006/0149850 A1 * | 7/2006 | Bowman | ....................... | 709/231 |
| 2006/0156375 A1 * | 7/2006 | Konetski | ....................... | 725/135 |
| 2006/0200259 A1 * | 9/2006 | Hoffberg et al. | ................. | 700/86 |
| 2007/0079334 A1 * | 4/2007 | Silver | ............................... | 725/58 |
| 2007/0093239 A1 * | 4/2007 | Camp, Jr. | ...................... | 455/418 |
| 2007/0180136 A1 * | 8/2007 | Li et al. | ......................... | 709/231 |
| 2007/0186003 A1 * | 8/2007 | Foster et al. | ................... | 709/231 |
| 2009/0047938 A1 * | 2/2009 | Khedher et al. | .............. | 455/416 |
| 2009/0125634 A1 * | 5/2009 | Virdi et al. | ..................... | 709/231 |
| 2009/0164655 A1 * | 6/2009 | Pettersson et al. | ............ | 709/231 |
| 2010/0023639 A1 * | 1/2010 | Bowman | ....................... | 709/231 |

* cited by examiner

*Primary Examiner* — Guang Li

(74) *Attorney, Agent, or Firm* — Amin, Turocy & Watson, LLP

(57) ABSTRACT

The claimed subject matter provides systems and/or methods that effectuate initiating, transferring, manipulating, and/or maintaining simultaneous real time streaming of multimedia content. The system can include devices and components that synchronize multimedia distribution to disparate user devices, distribute media streams to the disparate user devices, and provide media control over the media streams by the disparate user devices.

24 Claims, 18 Drawing Sheets

MULTIPLE DEVICES MULTIMEDIA CONTROL

BACKGROUND

Mobile devices and networking technologies have transformed many important aspects of everyday life. Mobile devices, such as smart phones, cell phones, and the like, have become a daily necessity rather than a luxury, communication tool, and/or entertainment center, and can now provide individuals with tools to manage and perform work functions such as reading and/or writing emails, setting up calendaring events such as meetings, providing games and entertainment aspects, and/or store records and images in a permanent and reliable medium. Networking technologies, like the Internet and/or wireless cellular telephone technologies, have provided users with virtually unlimited access to remote systems, information and associated applications.

Nevertheless, despite such advances in both mobile device technologies and ancillary network capabilities, the current problem facing users is the inability to use different devices with different communication capabilities to meet all their communication needs. In particular, current mobile device technologies and associated network capabilities do not address aspects related to the initiation, transfer, manipulation, or maintenance of streaming multimedia between multiple devices. Accordingly, the subject matter as claimed is directed toward resolving or at the very least mitigating, one or all of the foregoing problems.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

Users of communication services can typically utilize different devices with different communication capabilities to meet their communication needs. For instance, users can wish to initiate, transfer, manipulate, or otherwise maintain the simultaneous real time streaming of multimedia components (e.g. video, speech, audio) between multiple devices for a variety of reasons. For example, users can wish to control the coordinated delivery of simultaneous multimedia streams to multiple devices owned by the same user (e.g., to take advantage of the different video and audio capabilities of the different devices such as, high definition television, surround sound stereo, home speaker phone, and the like), or to control shared multimedia content in real time across multiple devices owned by others (e.g., who may be in different geographical locations). To meet the service requirements of at least the foregoing scenarios, the claimed subject matter can enable one or more users to control multimedia streams across multiple devices from one (e.g., a user's mobile device) or more devices interoperating with one or more access networks interworking with one or more core networks. Synchronization, content, and distribution functions necessary to effectuate the foregoing can be provided by disparate or the same core network and/or end user devices.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
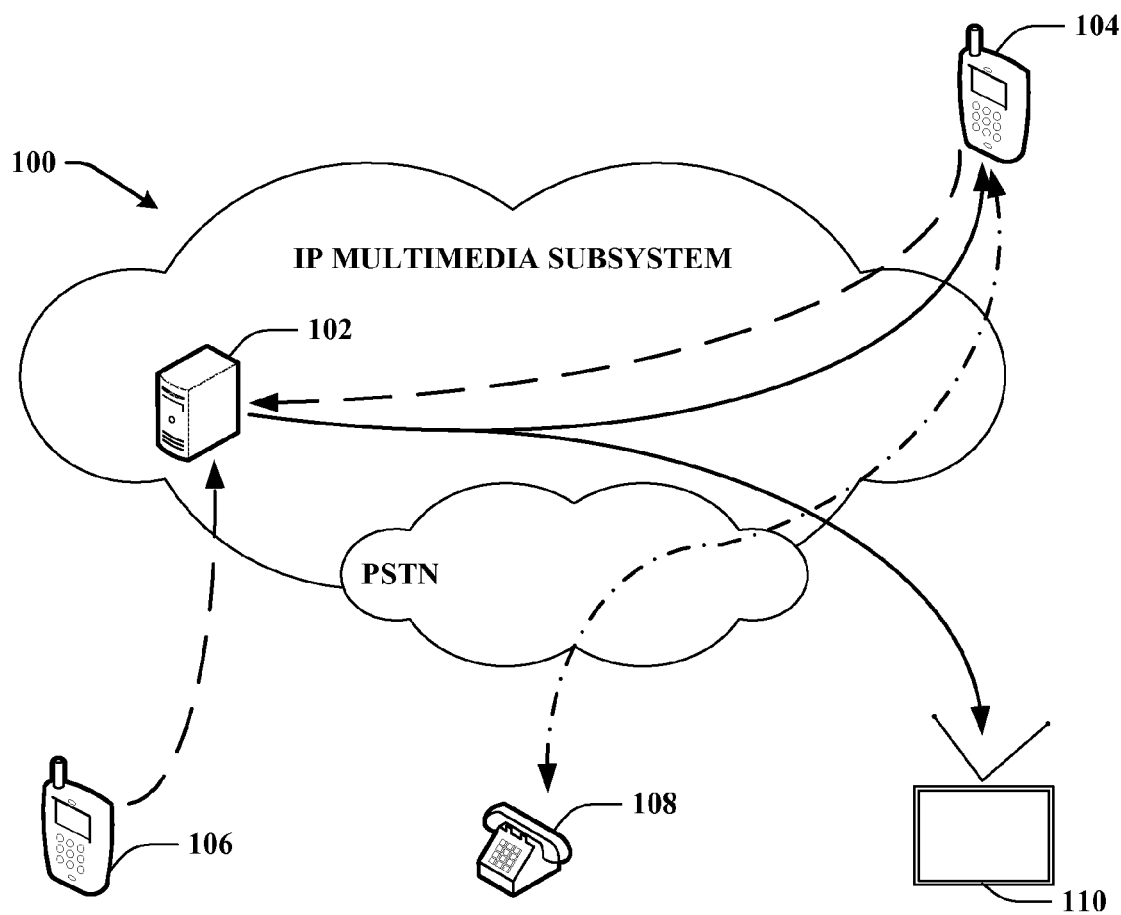
FIG. 1 illustrates a machine-implemented system that provides multimedia control over multiple disparate and/or distinct devices in accordance with an aspect of the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Users of communication services are increasingly attempting to use different devices with different communication capabilities to meet their communication needs. Users can wish to initiate, transfer, manipulate, or otherwise maintain the simultaneous real time streaming of multimedia components (e.g., video, speech, audio) between multiple devices for a variety of reasons. For example, users can wish to control the coordinated delivery of simultaneous multimedia streams to multiple devices owned by the same user (e.g., to take advantage of the different video and audio capabilities of the different devices (e.g., high definition television, surround sound stereo, home speaker phone), additionally and/or alternatively users, users can wish to share multimedia content in real time across multiple devices owned by others (e.g., who may be in different or disparate geographic locations). In accordance with aspects set forth herein, and in order to achieve the foregoing, the claimed subject matter can effectuate and/or facilitate multimedia control by one or more devices, interoperating with one or more access networks, and/or interworking with one or more core networks. Moreover, functionalities and/or facilities necessary to accomplish such multimedia control, for example, synchronization, signal relaying, content, and/or distribution, can be supplied by different components or sub-components within the same or separate core networks or end user devices. Furthermore as will be appreciated by those moderately conversant in this field of endeavor, user devices can consist of a wide array of wireless and/or wired devices with varying capability, including, for instance, cell phones, smart phones, laptop computers, Tablet PCs, multimedia Internet enabled phones, televisions, media servers, wired phones, digital video recorders (DVRs), and the like.

Turning now to FIG. 1 that provides a basic overview of the claimed subject matter and illustrates the need for, service requirements, and underlying concepts of the claimed subject matter. FIG. 1 illustrates a system 100 that provides multimedia control over multiple disparate and/or distinct devices in accordance with an aspect of the claimed subject matter. It should be noted without limitation or loss of generality that the disparate and/or distinct devices can include both geographically dispersed devices (e.g., a different country, state, city, location in a city, etc.) as well as devices that are situated in close proximity (e.g., in the next room, contiguous with one another, and the like). In furtherance of this illustration and to put the claimed matter in context consider the following example that for the most part informs the claimed subject matter, where Jane is browsing the Internet on her cell phone 104, which supports multimedia (e.g., video, speech, audio, . . . ). During the course of her browsing Jane finds her cousin's latest video on the Internet (e.g., a video sharing website where users can upload, view, and share video clips, and the like). Understandably, Jane is excited about the video, and wants to share it with the other members of her family, and talk to them about it. In order to facilitate the foregoing, Jane uses her cell phone 104 to call her father on his mobile device 106. Her father is also excited about the video and gathers the family members together in the living room of their home and transfers the speech from his mobile device 106 to the speaker phone 108 located in the family room so that the entire family can hear about the video and talk about it and share in this experience. To accomplish this Jane using her cell phone 104 sets up a video stream from the Internet video sharing website where her cousin's latest video clip has been uploaded to an application server 102 which then simultaneously streams the video clip to both Jane's cell phone 104 as well as the family's high definition television (HDTV) 110.

When everyone is ready, Jane through her cell phone 104 and in concert with facilities and functionalities associated with application server 102 starts the video playing both on Jane's cell phone 104 as well as on the family's high definition television (HDTV) 110. As the video plays Jane can provide insightful comments about the different parts of the video through her cell phone 104 (e.g., using the sound system associated with high definition television (HDTV) 110 and/or through the speaker phone 108), and further she can occasionally pause the video to provide comments. Moreover, when Jane's father has questions or wants to pause the video to say something, he too can pause the video using the control capabilities provided by his mobile device 106.

It should be noted in regard to the foregoing scenario, without limitation or loss of generality, that multimedia and/or the streaming of multimedia can be controlled exclusively by a single device (e.g., Jane's cell phone 104 at the beginning), control can then be transferred between users and/or devices as necessary and/or as required, control can also be shared between multiple devices and/or users (e.g., Jane's cell phone 104 and her father's mobile device 106), and devices (e.g., high definition television (HDTV) 110, speaker phone 108, etc.) can be dynamically added or removed to share content as the need dictates.

From the foregoing synoptic overview, those of moderate skill in the art will appreciate that the claimed subject matter provides systems and methods that enable users to initiate, transfer, manipulate, or otherwise maintain the simultaneous real time streaming of multimedia (e.g., video, speech, and/or audio) between multiple devices. Additionally, the claimed matter enables the coordinated delivery of simultaneous multimedia streams to multiple devices owned by the same or different users, facilitates one or more users to control multimedia streams across multiple devices from one or more devices interoperating with one or more access networks interworking with one or more core networks and allowing for separate session and media control signaling, and further enables key functions (e.g., command provision, signaling synchronization, signaling relay, content provision, and content distribution) to be flexibly supplied in a variety of configurations by different or the same core network or end user devices.

In order to actuate the foregoing functionalities and/or facilities, the claimed matter can utilize a set of components that can be flexibly interworked to provide the necessary functionality in a variety of communication configurations. This set of components can provide a core network entity, such as an application server 102 or a similar entity to establish, synchronize, and/or otherwise maintain media streams between multiple disparate devices (e.g., Jane's cell phone 104, her father's mobile device 106, the family's speaker phone 108, and/or the family's high definition television (HDTV) 110, etc.).

In order to establish, synchronize, and/or maintain media streams between multiple devices, the claimed subject matter can employ control signaling wherein a signal can be transmitted from one or more user devices, through one or more access networks, and through one or more core networks, to the core network entity (e.g., application server 102) providing the synchronization functionality. Thus, the network entity that provides synchronization functionality, such as an application server 102 that utilizes session initiation protocol (SIP), can be interposed in the control path for manipulation of the media stream(s). It should be noted in this context, without limitation or loss of generality, that separate control signaling can be used for the session and media components of the claimed subject matter.

In addition, to achieve the necessary synchronization, a synchronization functionality that interfaces with a content distribution aspect can be utilized. The synchronization functionality can ensure that the same sequential place in the stream is provided at the same time to each of the end user devices (e.g., Jane's cell phone 104, Jane's father's mobile device 106, the family speaker phone 108, and the family high definition television (HDTV) 110) so that the users of these devices can share the same or, at the very least, a substantially similar user experience with respect to the provision of the media. Further the content distribution aspect can provide data replication and streaming functionality. The content distribution aspect can be co-located in the same application server 102 as the synchronization functionality, or it can be provided by a separate server. Where the content distribution functionality is provided by a separate server, industry standard protocols, such as, for example, session initiation protocol (SIP), can be employed to exchange control signaling between the synchronization and content distribution aspects where these are situated on separate servers.

Moreover, in regard to the content distribution functionalities set forth and utilized herein by the claimed subject matter, the content distribution aspect can obtain multimedia content for distribution (or re-distribution) from the same application server (e.g., application server 102) that supplies the synchronization capability. Additionally and/or alternatively, multimedia content can be received, retrieved, and/or solicited from other disparate sources (e.g., servers, databases, or other devices). As those of ordinary skill in the art will comprehend without limitation or loss of generality, where content is supplied, obtained, elicited, and/or received from separate servers (or services), industry standard protocols (e.g., session initiation protocol (SIP)) can be utilized to exchange signaling and data transmission between the content distribution aspects and the content source aspects. Moreover, as will also be understood by those moderately conversant in this field of endeavor, multimedia streams can be established between a single device or multiple disparate devices and the distribution facility based at least in part on the control information supplied by the control signaling aspect elucidated above.

The foregoing components and/or aspects, the distribution of the facilities and/or functionalities between the components and/or aspects, the processing that can take place in the components and/or aspects, and the control signaling and data transmission between the components can be provided in a variety of component configurations. As will no doubt be understood by persons of reasonable skill in the art, each of these disparate component configurations can impose different interfacing requirements between the components and/or aspects.

It should be noted in connection with the following illustrative configurations that in order to avoid undue complexity, in the following configurations only the key components are illustrated. Common communication network interconnecting entities such as session border controllers, media gateways, and the like, are not depicted.

Functions and facilities that are illustrated can include content components that can provide the source of the multimedia content that is shared by the users and distribution components that can replicate and transmit the content to the users. Additional facilities and functionalities can include control components that can provide the command structure necessary to control a multimedia session setup and/or the source of commands that control multimedia content (e.g., play, pause, rewind, fast-forward, add a user, drop a user, etc.), synchronization aspects that can provide for the collection of commands from users, replication and transmission of commands to users, arbitration of conflicting commands from different users, and the like, and relay capabilities that can be utilized to pass commands from one source to another destination (which may or may not be known to the original source).

It should be noted without limitation or loss of generality that in the configurations portrayed as follows, control can be provided by one or more devices, interoperating with one or more access networks, and interworking with one or more core networks. Moreover, signaling and data transmission between components can be accomplished by one or more industry common signaling and data transmission protocol (e.g., session initiation protocol (SIP), real time streaming protocol (RTSP), hypertext transfer protocol (HTTP), extensible markup language (XML), etc.) and synchronization, signal relaying, content, and distribution functions can be performed by different entities, such as application servers or content servers, or other entities within the same or distinct but separate core networks or end user devices. The end user devices contemplated to be utilized in conjunction with the claimed subject matter can include a wide variety of wireless and/or wireline devices with varying capability, including for example, cell phones, smart phones, laptop computers, Tablet PCs, desktop computers, consumer and/or industrial devices and/or appliances and/or instrumentation, hand held devices, personal digital assistants, multimedia Internet enabled phones, multimedia players, wired telephones, televisions, digital video recorders (DVRs), personal video recorders (PVRs), media servers, and the like.

Figure 2:
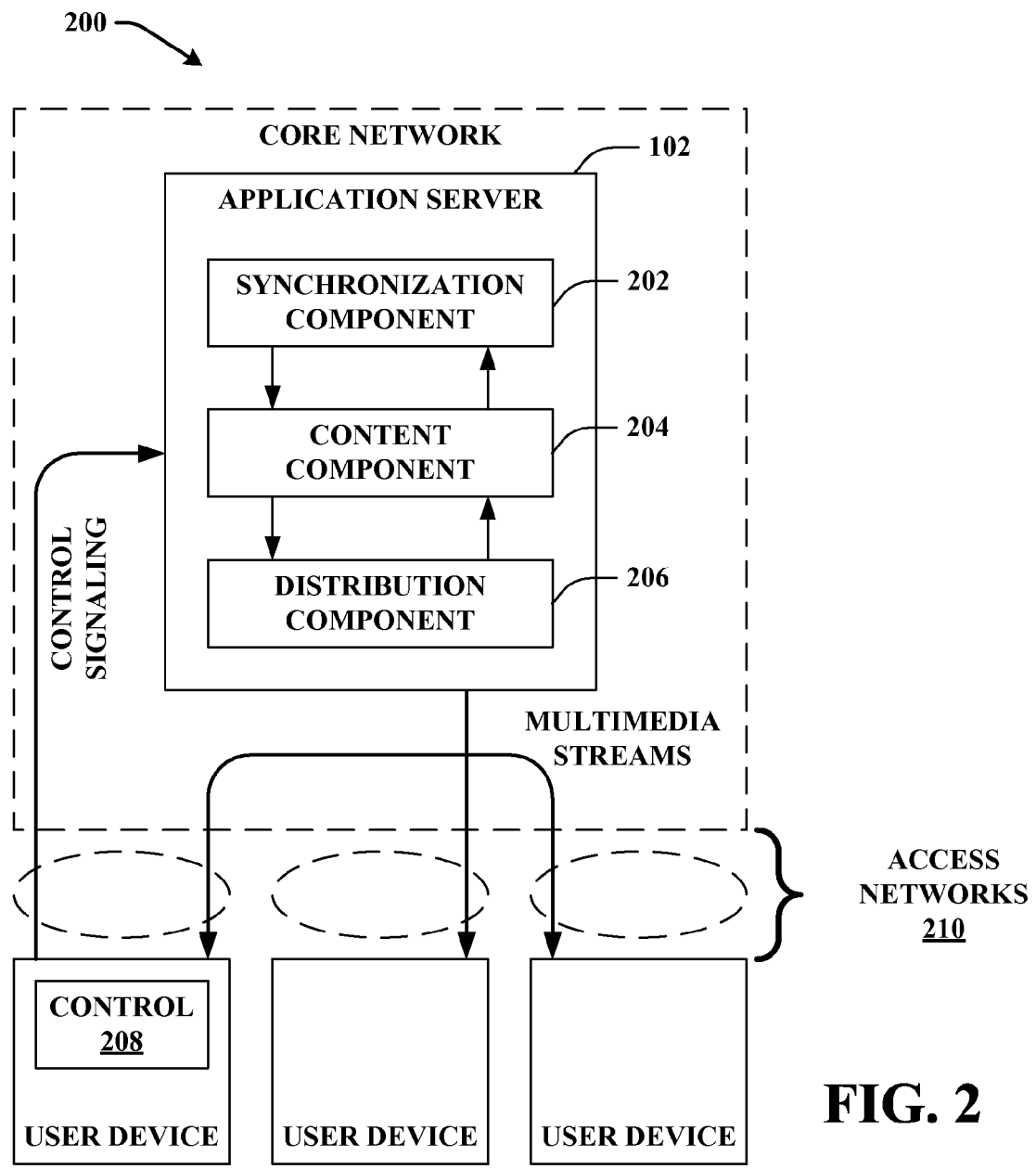
FIG. 2 illustrates a machine-implemented system that facilities and/or effectuates the initiation, transfer, manipulation, or maintenance of simultaneous real time streaming of multimedia between multiple devices in accordance with an aspect of the claimed subject matter.

FIG. 2 provides illustration of a system 200 that facilities and/or effectuates the initiation, transfer, manipulation, or maintenance of simultaneous real time streaming of multimedia (e.g., video, speech, and audio) between multiple devices in accordance with an aspect of the claimed subject matter. In this depiction to continue the usage example presented above, Jane shares video with her family wherein she controls from her device the initiation of the streaming of the multimedia content.

As illustrated system 200 can include application server 102 situated in a core network that can be employed to initiate, transfer, manipulate, and/or maintain the simultaneous streaming of multimedia content in real time between a multitude of disparate user devices. Application server 102, via one or more access networks 210, can be in continuous and/or operative or sporadic and/or intermittent communication with a multitude of user devices such as wireless and wireline devices with varying capability, including for instance, cell phones, wired phones, personal computers, personal digital assistants, televisions, digital video recorders (DVRs), media servers, and the like. Application server 102 can be implemented entirely in hardware and/or a combination of hardware and/or software in execution. Further, application server 102 can be incorporated within and/or associated with other compatible components. Additionally, application server 102 can be, but is not limited to, any type of machine that includes a processor and/or is capable of effective communication with access networks 210. Illustrative machines that can comprise application server 102 can include desktop computers, server class computing devices, cell phones, smart phones, laptop computers, notebook computers, Tablet PCs, consumer and/or industrial devices and/or appliances, hand-held devices, personal digital assistants, multimedia Internet mobile phones, multimedia players, and the like.

As depicted application server 102 can include synchronization component 202 that can interface with a distribution component 206 to provide the functionality and/or facilities necessary to ensure that the same sequential place in a media stream is provided at the same instant in time to each of the user devices so that the users of each of the user devices can share the same or a substantially similar user experience with respect to the provision of media supplied by content component 204.

The component configuration provided in FIG. 2 can be considered as a basic functional distribution that minimizes the number of separate components and thereby the signaling and/or data transmission complexity. As illustrated, a control signal can be provided from a control aspect 208 situated in a single user device (e.g., Jane's cell phone 104). The control signal can be transmitted through one or more access networks 210 to application server 102 situated in a core network. The control signaling initiated by control aspect 208 can instigate synchronization component 202 to interface with distribution component 206 to ensure that the same sequential place in the media stream is provided at the same time to each and all of the participating end user devices. Based at least in part on input from synchronization component 202, distribution component 206 can access content component 204 in order to obtain multimedia content that distribution component 206 can replicate and stream to the various participating user devices.

Figure 3:
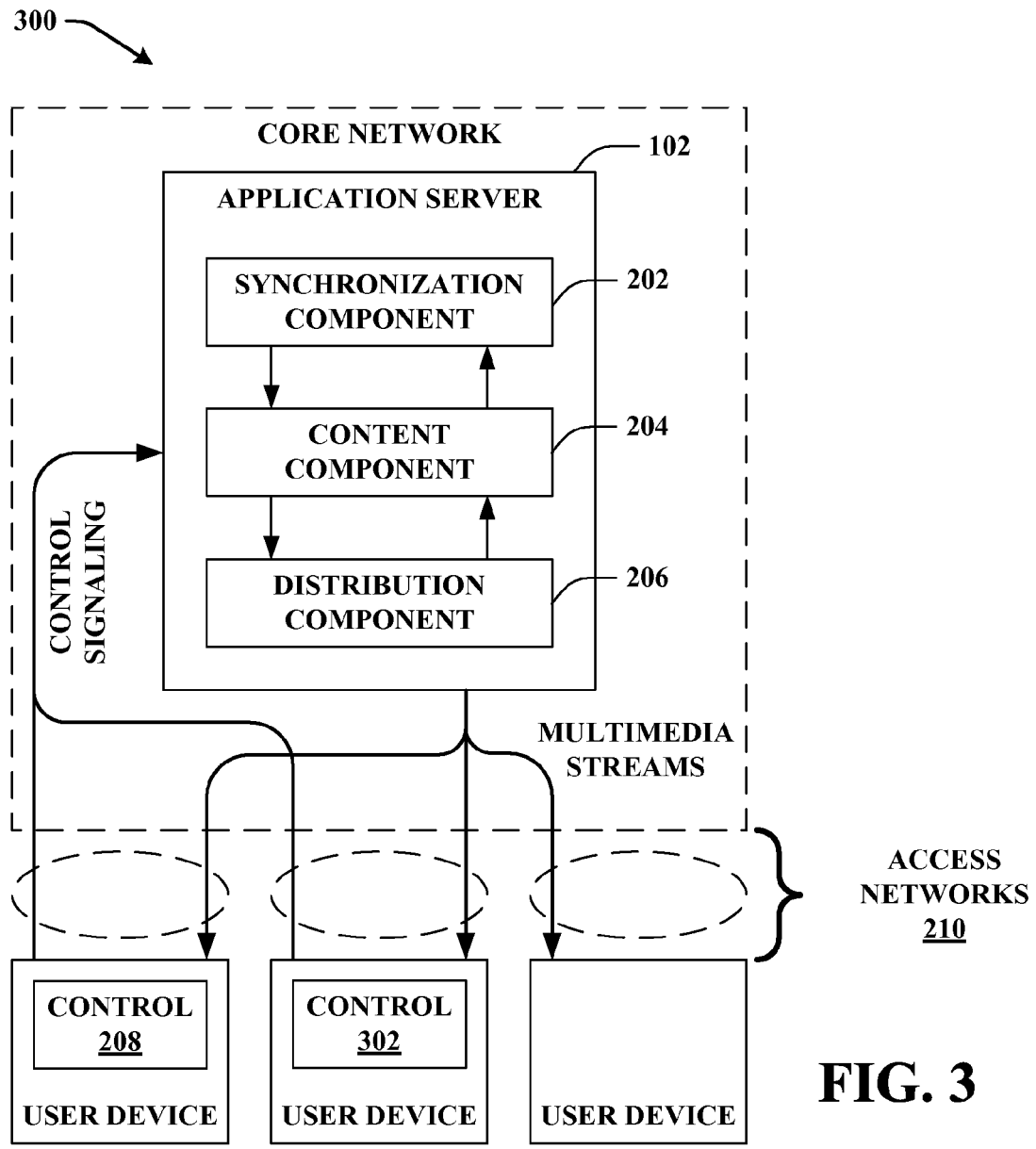
FIG. 3 illustrates a machine-implemented system that enables users to initiate, transfer, manipulate, or otherwise maintain the simultaneous real time streaming of multimedia between multiple devices in accordance with an aspect of the claimed matter.

FIG. 3 depicts a system 300 that enables users to initiate, transfer, manipulate, or otherwise maintain the simultaneous real time streaming of multimedia between multiple devices in accordance with an aspect of the claimed matter. To continue the ongoing illustrations regarding Jane and her family, in this usage case either Jane or her father through their respective devices can pause the shared multimedia stream in order to provide commentary. It is to be appreciated that either Jane or her father can resume the video when they are ready to do so. Because much of the configuration and operation of application server 102 and its associated components (e.g., synchronization component 202, content component 204, and distribution component 206) is substantially similar to those described earlier, a detailed description of such features, unless where necessary, has been omitted to avoid needless repetition and for the sake of brevity and conciseness.

As depicted, the control functionality (e.g., control 208 and control 302) has been distributed across multiple devices (e.g., Jane's cell phone 104 and her father's mobile device 106). This enables multiple users to simultaneously control the streaming media emanating from the core network. In this instance, synchronization component 202 can arbitrate between conflicting control signaling emanating from control 208 and/or control 302. Such arbitration can include consideration of user control priority, timing of received signals, etc. Nevertheless, it should be noted without limitation or loss of generality that in all configurations, a mix of controlling and non-controlling devices is possible. User devices without control capabilities can include those that are not capable of this function, for example a wireline plain old telephone (POT) used as a speakerphone (e.g., speakerphone 108).

Figure 4:
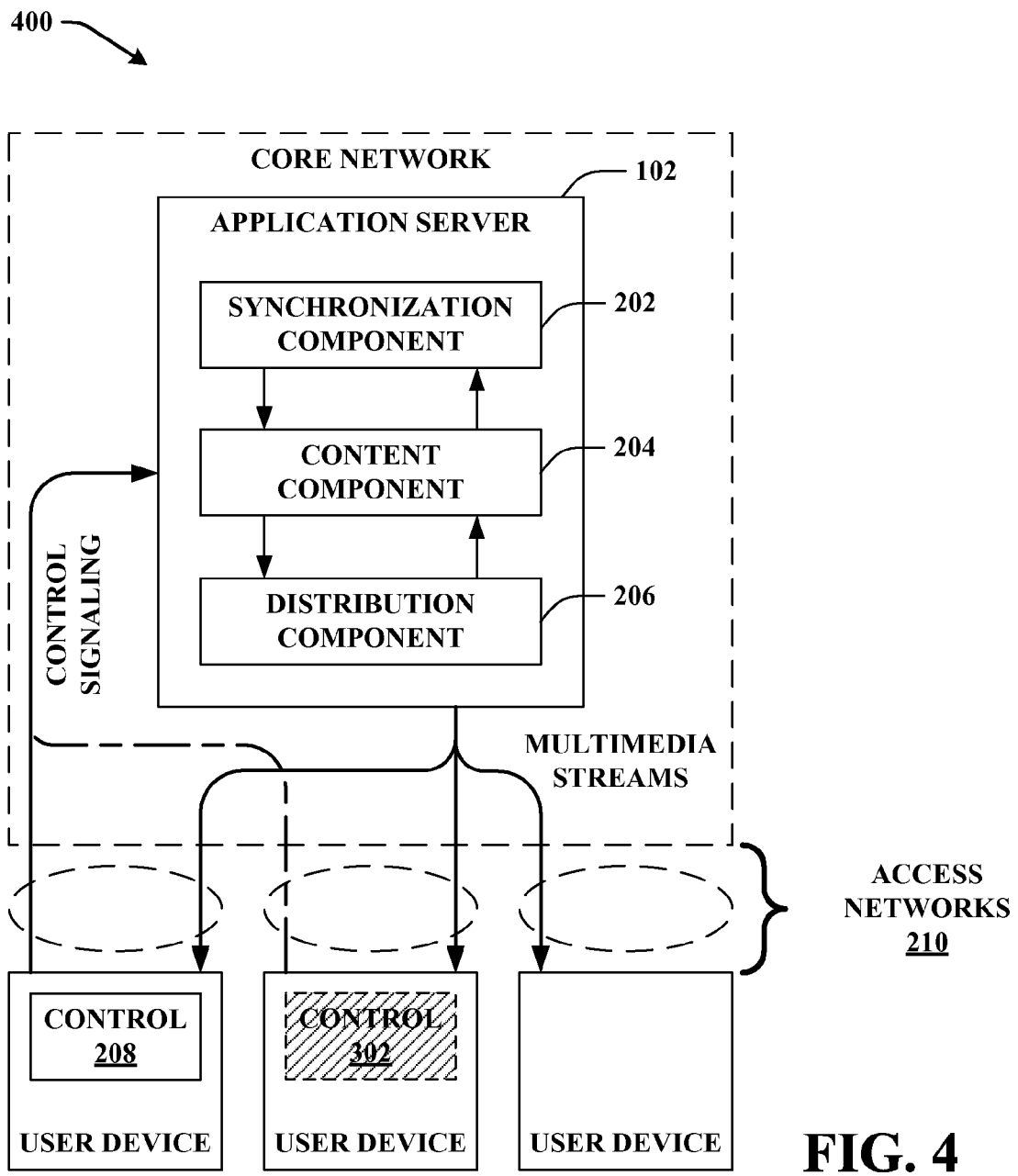
FIG. 4 illustrates a further machine-implemented system that actuates the initiation, transfer, manipulation, and/or maintenance of simultaneous real time streaming of multimedia between a plurality of diverse devices in accordance with an aspect of the claimed subject matter.

FIG. 4 illustrates a system 400 that actuates the initiation, transfer, manipulation, and/or maintenance of simultaneous real time streaming of multimedia between a plurality of diverse devices in accordance with an aspect of the claimed subject matter. In furtherance of the continuing example, in this instance Jane initiates a video sharing session with her family members using the control functionality 208 associated with her cell phone. Once the video sharing session has commenced Jane passes exclusive control to her father who controls the session through the facilities provided by control 302 associated with his mobile device.

As previously noted, for all configurations, control can be provided from only one device, or from multiple devices. FIG. 4 provides illustration of the circumstance when control is being provided by a single device even though the control functionality can exist in multiple devices. Exclusive control can be limited to one of the devices despite the fact that the control functionality resides on multiple devices. Moreover, control capabilities associated with user devices can be passed from one device to another. Accordingly, other devices besides the instigating and controlling user device can have a control function that albeit is temporarily inactive (e.g., does not signal to synchronization component 202; or if control signals are supplied to synchronization component 202 such signaling is ignored or discarded by synchronization component 202).

Figure 5:
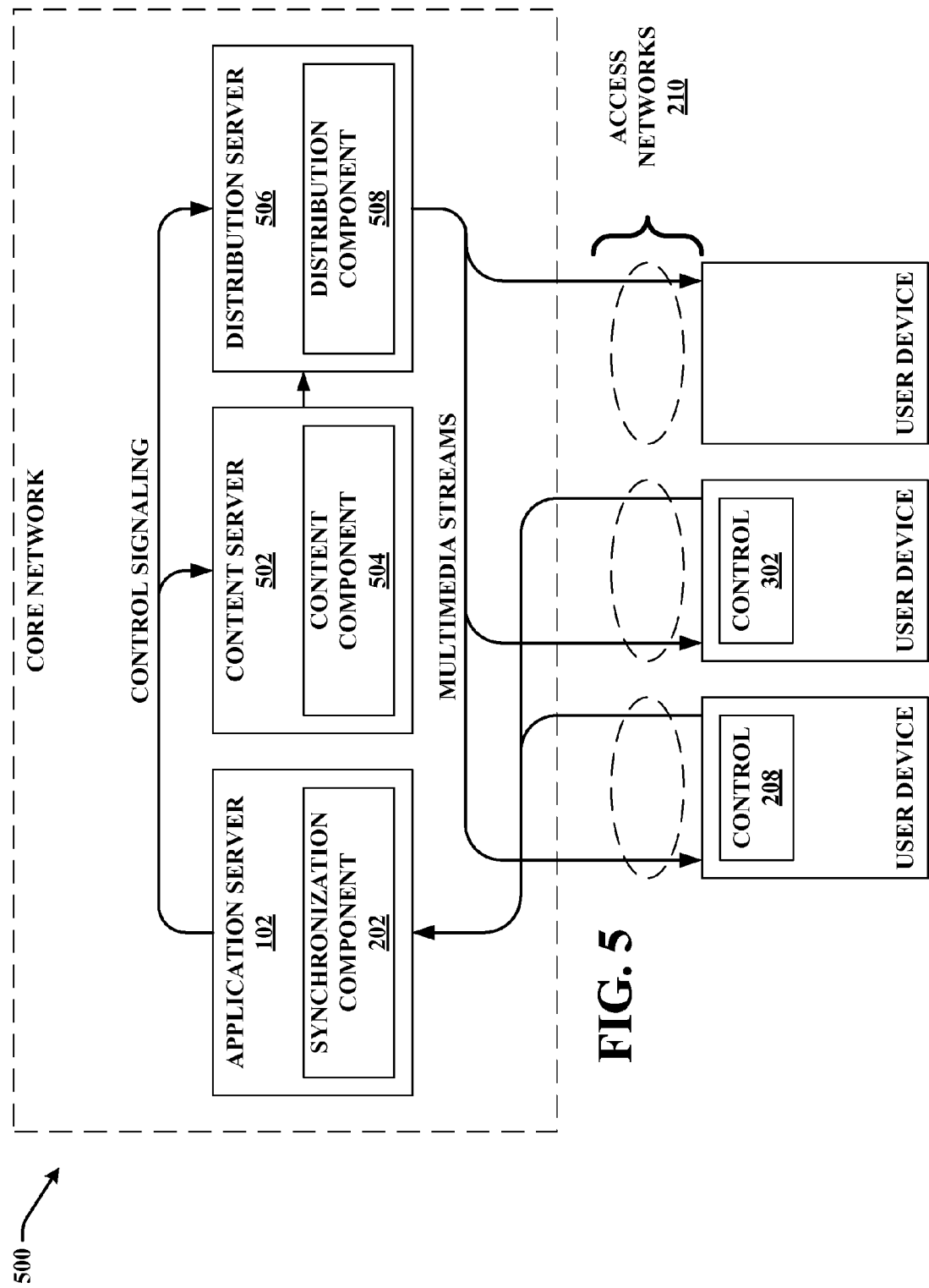
FIG. 5 illustrates another machine-implemented system that effectuates and/or facilitates the initiation, transfer, manipulation, and/or maintenance of simultaneous real time streaming of multimedia between various diverse devices in accordance with an aspect of the claimed subject matter.

FIG. 5 depicts a system 500 that effectuates and/or facilitates the initiation, transfer, manipulation, and/or maintenance of simultaneous real time streaming of multimedia between various diverse devices in accordance with an aspect of the claimed subject matter. The usage case depicted in FIG. 5 envisions a service provider that has several different content servers 502 and distribution servers 506 dispersed throughout a core network. Under this scenario application server 102 can be an interworked application specific service where the synchronization component 202, content component 504, and distribution component 508 are being provided from a common core network but each of these components is situated on disparate servers (e.g., application server 102, content server 502, and distribution server 506, respectively). As will be appreciated by those or moderate skill in the art, dispersion of these functionalities over disparate servers in the core network can introduce additional signaling and/or data transmission interfacing requirements. For example, in addition to control signaling emanating from control 208 and control 302 associated with disparate and/or geographically dispersed user devices, control signaling needs to also be provided from application server 102 to both content server 502 and distribution server 506.

Figure 6:
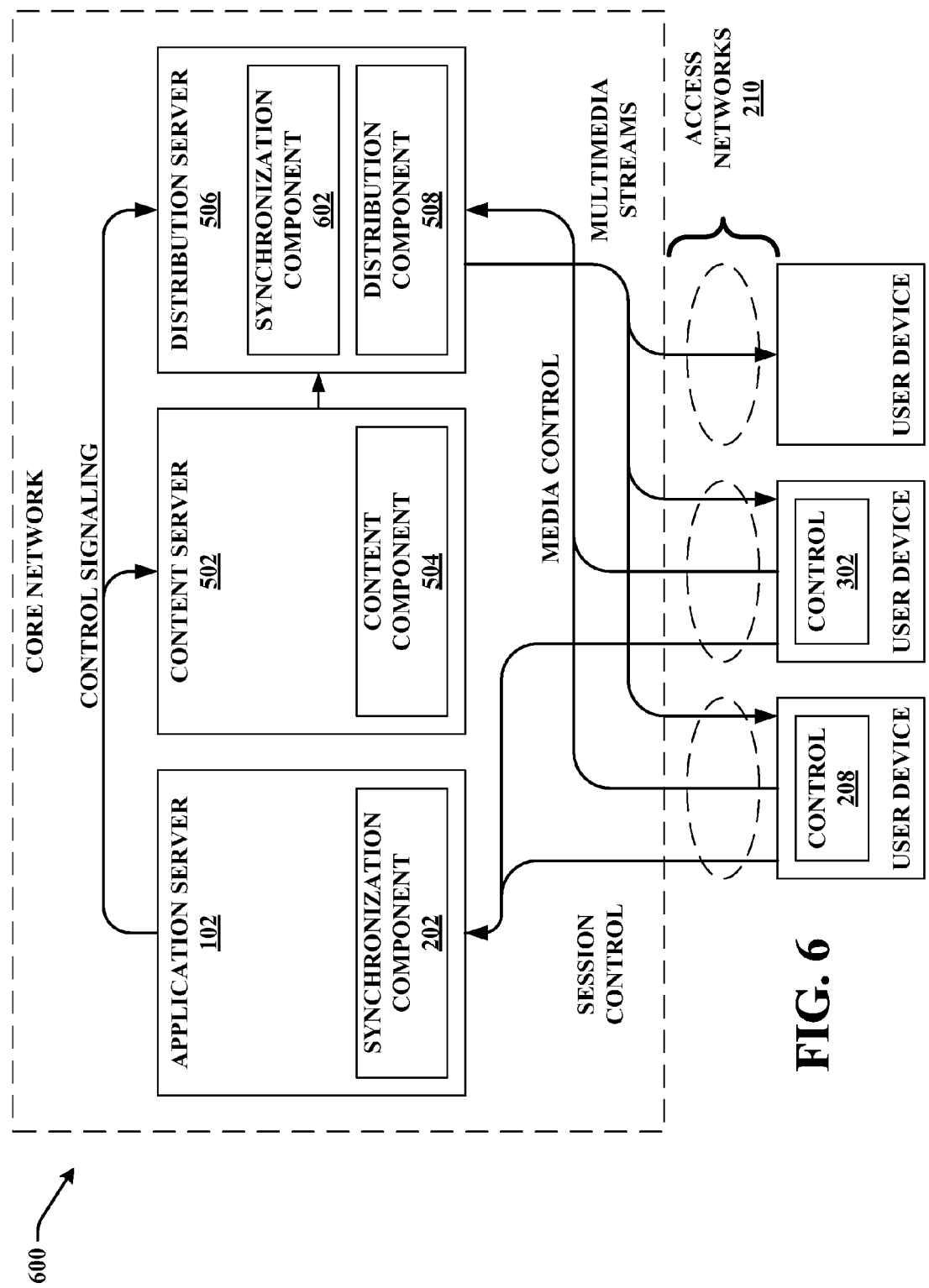
FIG. 6 illustrates a system implemented on a machine that facilitates and/or actuates the transfer, manipulation, and/or maintenance of simultaneous real time streaming of multimedia content between a variety of disparate devices in accordance with various aspects of the claimed subject matter.

FIG. 6 provides exemplification of a system 600 that facilitates and/or actuates the transfer, manipulation, and/or maintenance of simultaneous real time streaming of multimedia content between a variety of disparate devices in accordance with various aspects of the claimed subject matter. The usage case illustrated in FIG. 6 pertains to optimizing signaling. To optimize signaling, a service provider typically should enable distributed (e.g., separate) session and media synchronization functionality with signaling from the user device for each. Accordingly, in this scenario session control (e.g., SIP) can be provided between user devices (e.g., control 208 and/or control 302) and application server 102, and media control (e.g., real time streaming protocol (RTSP) for play/forward/rewind, etc.) can run directly between user devices and distribution server 506. Accordingly, two synchronization components can be utilized, one situated on application server 102 (e.g., synchronization component 202) for synchronization and arbitration of session signaling and the other located on distribution server 506 for synchronization and arbitration of media control commands. The session control synchronization component 202 thus can coordinate with the media control synchronization component 602 for setup and tear down of media for a particular session or when adding/removing sessions. It should be noted that the foregoing signaling methodology can be applicable to other component configurations where the distribution functionality provided by distribution server 506, and more particularly distribution component 508, is provided separately from the synchronization functionality provided by synchronization component 202.

Figure 7:
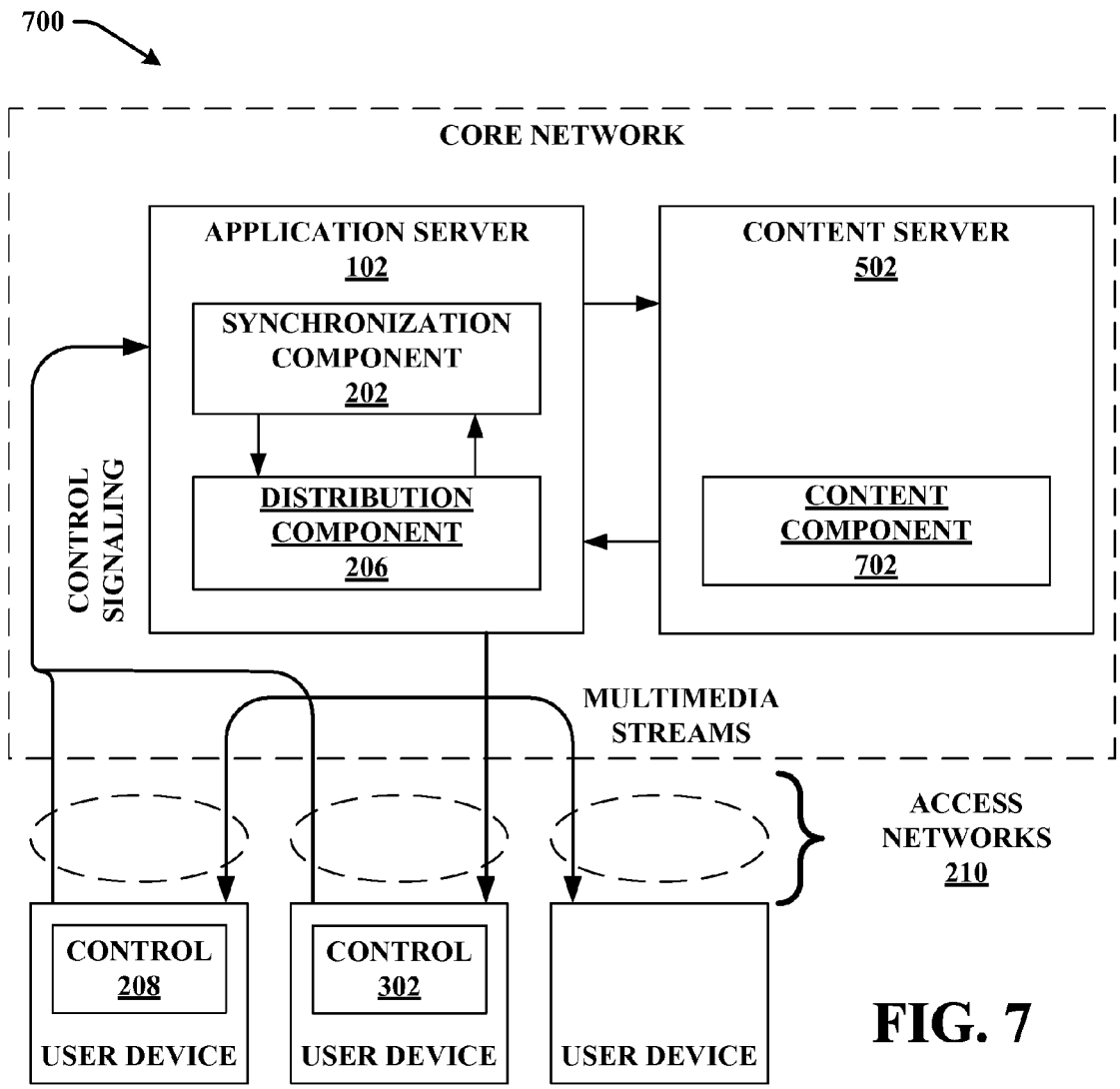
FIG. 7 illustrates yet another system implemented on a machine that effectuates the manipulation, transfer, and/or maintenance of simultaneous real time streaming of multimedia content between a plethora of disparate and geographically dispersed devices in accordance with one or more aspects of the claimed subject matter.

FIG. 7 depicts a system 700 that effectuates the manipulation, transfer, and/or maintenance of simultaneous real time streaming of multimedia content between a plethora of disparate and geographically dispersed devices in accordance with one or more aspects of the claimed subject matter. The usage case provided by FIG. 7 illustrates the situation where a service provider already has several different content servers. Multiple device multimedia control capability is introduced by adding an interworked application specific server 102 to the existing infrastructure. It has been observed that the core network signaling and data transmission complexity resulting from providing separate servers for each of the functions provided in the core network can be circumvented and/or mitigated by combining some functions in a common server. Accordingly, as depicted system 700 combines synchronization and distribution components on a common application server 102 while obtaining or soliciting content from (one or more) separate content server(s) such as content server 502, and more particularly, retrieving or eliciting content from content component 702 that can be associated with content server 502.

Figure 8:
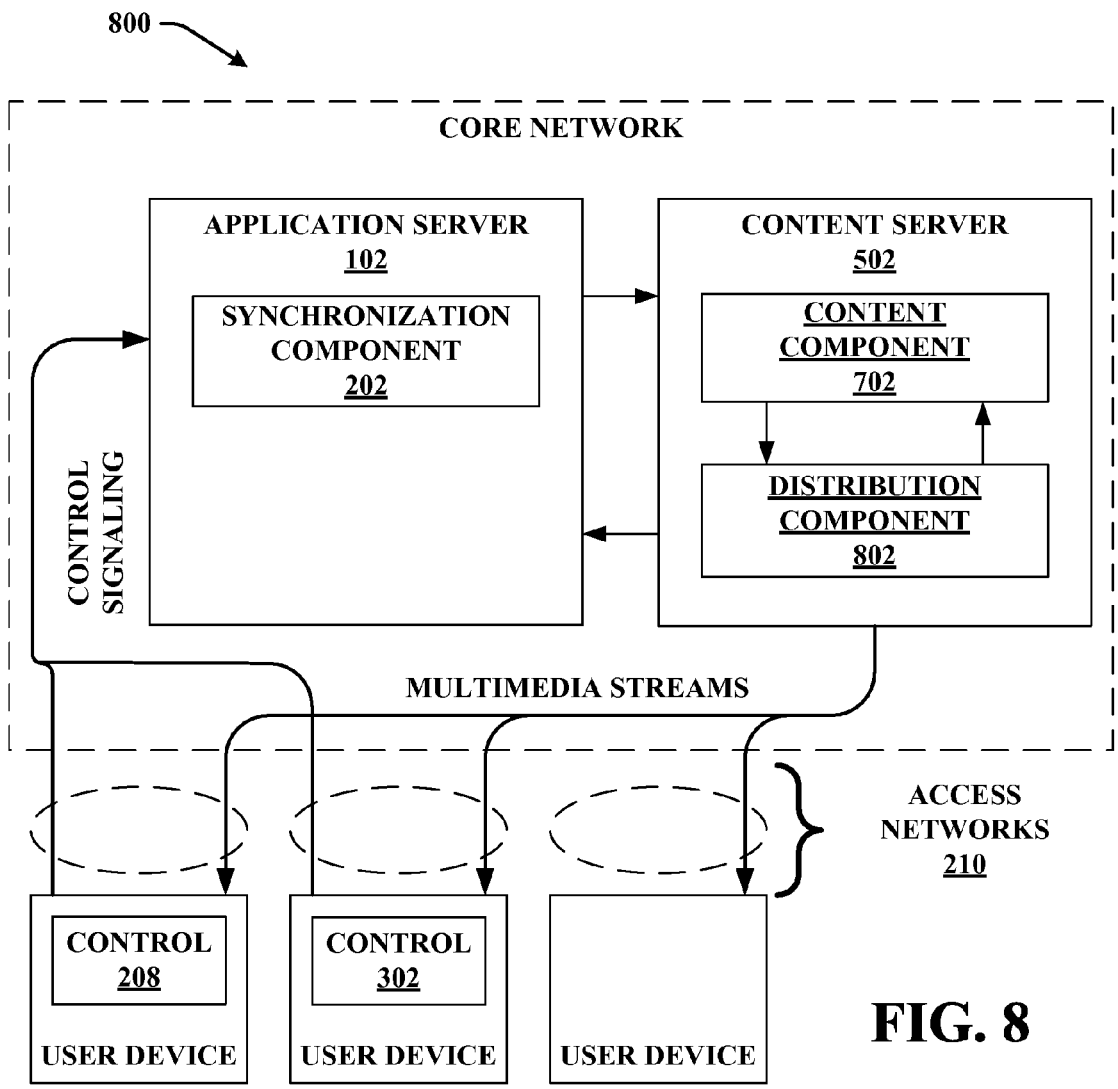
FIG. 8 illustrates a machine implemented system that facilitates and/or effectuates the initiation, transfer, manipulation, and/or maintenance of simultaneous real time streaming of multimedia content between a wide disparity of devices in accordance with various aspects of the claimed matter.

FIG. 8 illustrates a system 800 that facilitates and/or effectuates the initiation, transfer, manipulation, and/or maintenance of simultaneous real time streaming of multimedia content between a wide disparity of devices in accordance with various aspects of the claimed matter. The usage case in this instance relates to A service provider that already has a content server 502 that also provides distribution through a distribution component 502. Multiple device multimedia control capability is introduced by adding an interworked application specific server 102 to the existing infrastructure. It should be noted that this configuration illustrates combining content and distribution functions represented by content component 702 and distribution component 802 in a common content server 502 while providing the synchronization functionality from a synchronization component 202 situated on the interworked but separate or distinct application specific server 102.

Figure 9:
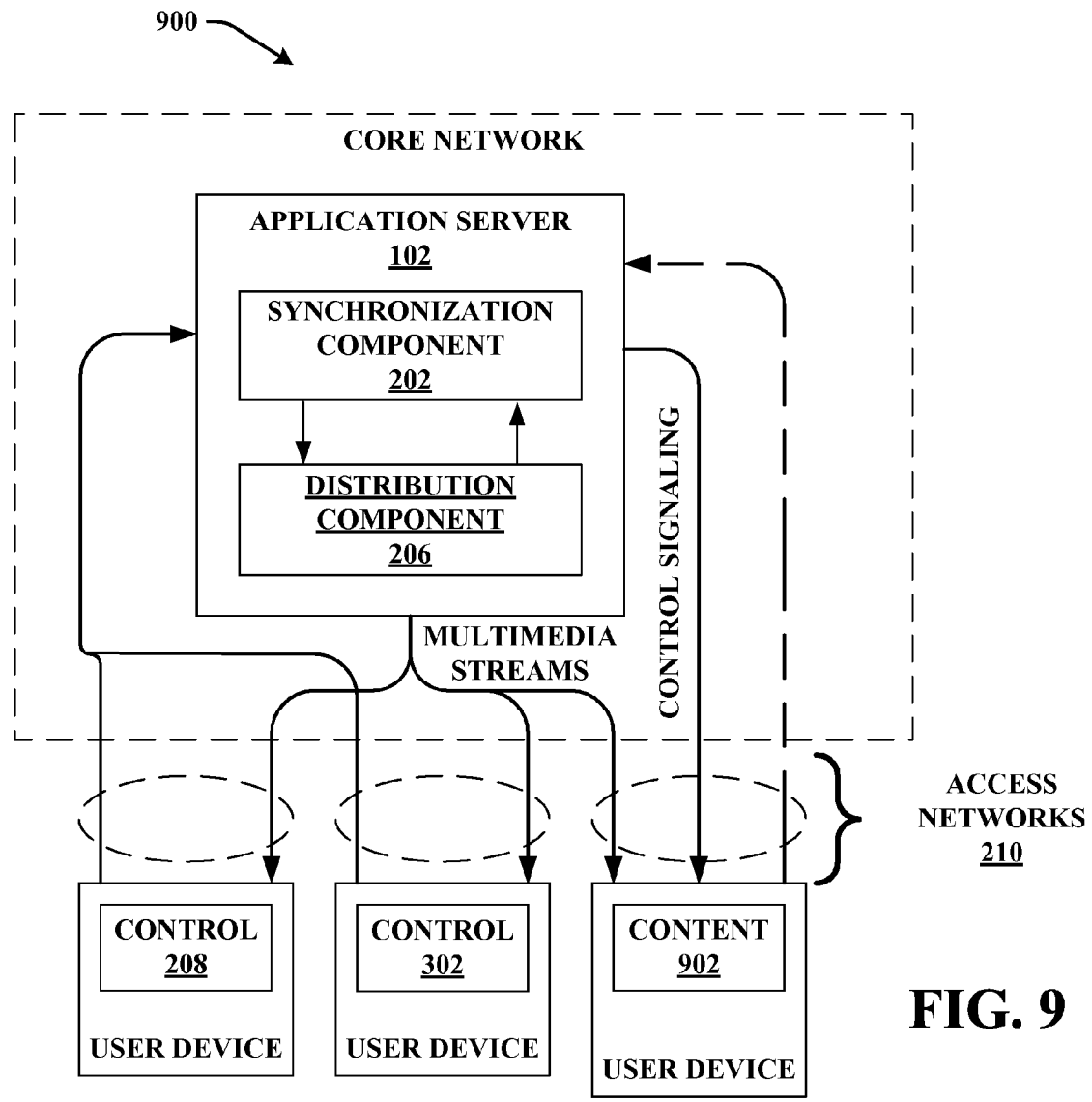
FIG. 9 illustrates a machine implemented system that effectuates initiation, transfer, manipulation, and/or maintenance of simultaneous real time streaming of multimedia content between a disparity of devices in accordance with various aspects of the claimed matter.

FIG. 9 illustrates a system 900 that effectuates initiation, transfer, manipulation, and/or maintenance of simultaneous real time streaming of multimedia content between a disparity of devices in accordance with various aspects of the claimed matter. As a continuation of the ongoing illustration in connection with Jane and her family, Jane's friend, Mary, now wishes to share a video that has been persisted on Mary's cell phone with the others. As depicted in system 900 this configuration allows for the provisioning of content (e.g., content 902) from any viable device, independent of the control function. Although system 900 illustrates content 902 being supplied from a user device without control per se, the content providing user device could nevertheless also include a control aspect.

Figure 10:
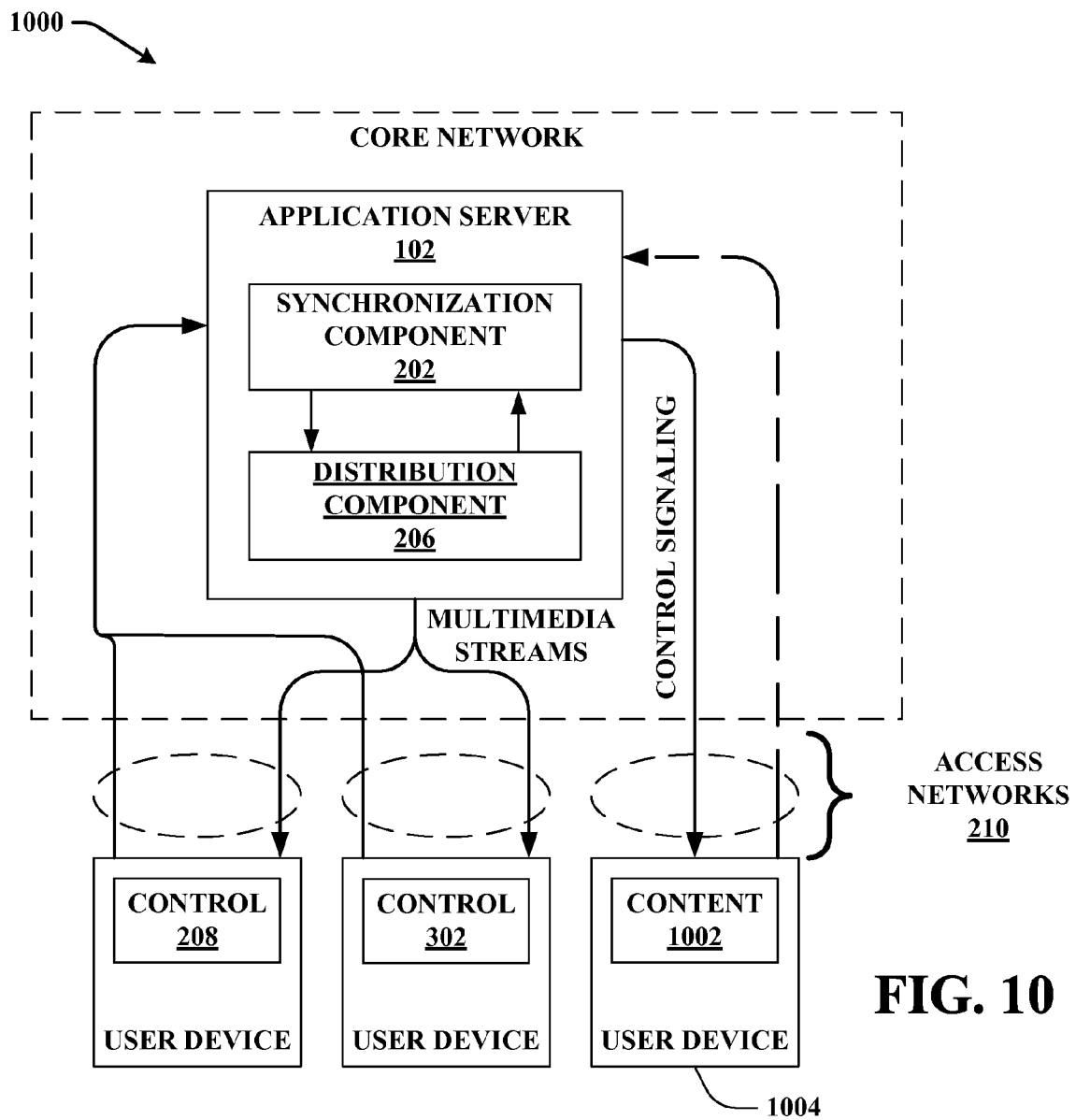
FIG. 10 illustrates yet another illustrative machine implemented system that initiates, transfers, manipulates, and/or allows for the maintenance of simultaneous real time streaming of multimedia content between a diversity of devices in accordance with aspects of the claimed matter.

FIG. 10 depicts a system 1000 that initiates, transfers, manipulates, and/or allows for the maintenance of simultaneous real time streaming of multimedia content between a diversity of devices in accordance with aspects of the claimed matter. As a further continuation of the ongoing illustration regarding Jane, Jane in this scenario is sharing content from her mother's digital video recorder (DVR). Here by providing content 1002 from user device 1004 (e.g., Jane's mother's DVR), user device 1004 can fulfill the role of both the content provider as well as the content server. In accordance with this aspect however, user device 1004 does not provide a control function, and multimedia is not consumed by a user directly on the device. As such, content is not streamed back to the device providing the content (e.g., user device 1004), but rather control signaling is supplied to content providing device 1004.

Figure 11:
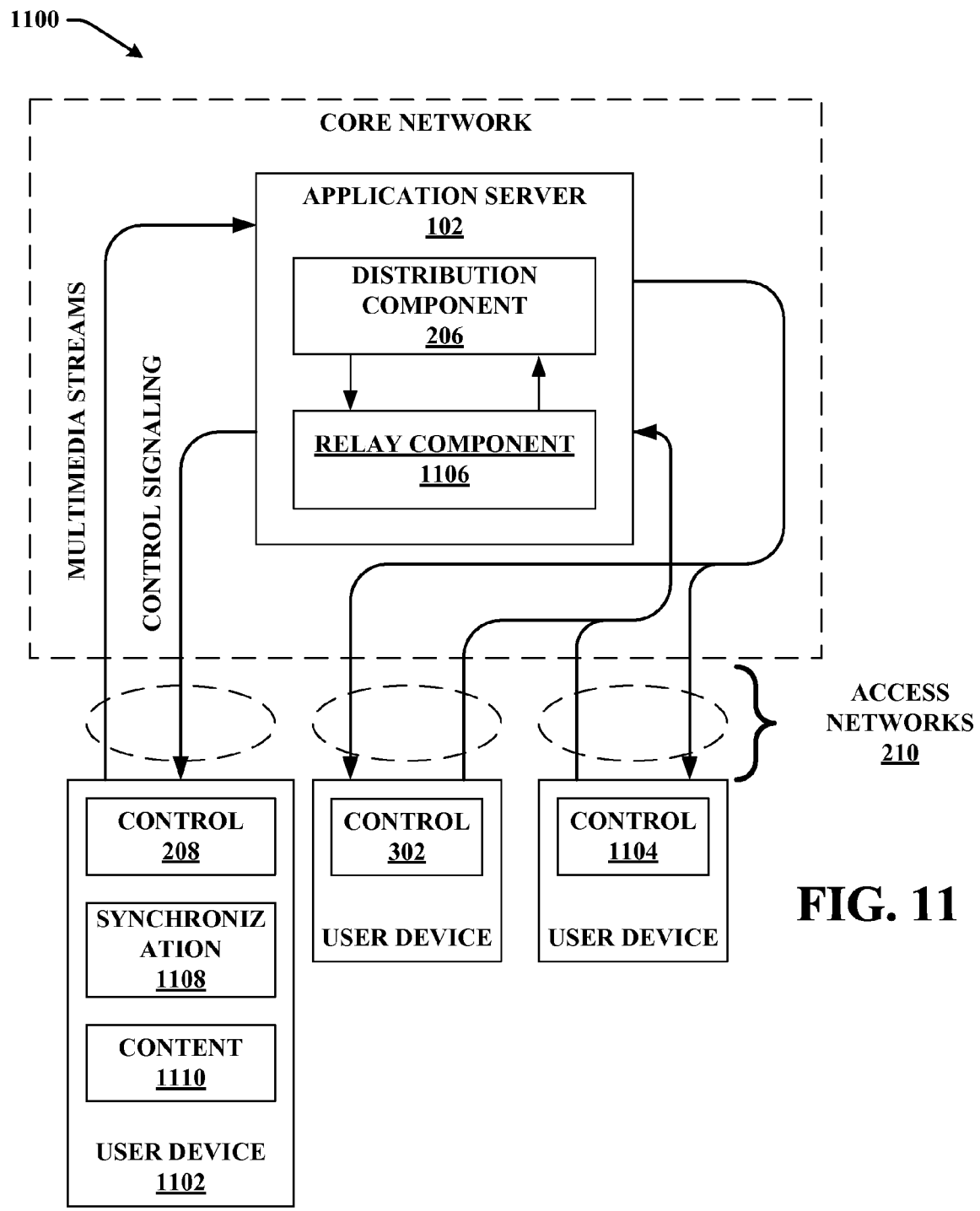
FIG. 11 illustrates a system implemented on a machine that allows for the initiation, transfer, manipulation, and/or maintenance of simultaneous real time streaming of multimedia content between diverse devices in accordance with various aspects of the claimed matter.

FIG. 11 illustrates a system 1100 that allows for the initiation, transfer, manipulation, and/or maintenance of simultaneous real time streaming of multimedia content between diverse devices in accordance with various aspects of the claimed matter. In this instance, Jane is sharing content from her cell phone 1102 and control is shared between Jane and her father. The content on her cell phone 1102 is locally persisted and/or provided (e.g., thereby avoiding lag problems she could otherwise experience). Here it should be noted that where a user has local control of shared content on their device (e.g., 1102), then the shared control from other devices must be provided to the content providing device as well. Thus in addition to the control aspect 208 previously described, user device 1102 can also include synchronization facilities 1108 and the content 1110 being shared amongst the other user devices. Moreover, in order to facilitate and/or effectuate the foregoing a relay component 1106 can be situated or associated with application server 102. Relay component 1106 can pass commands from one source (e.g., user device 1102, control 302, and/or control 1104) to another destination which may or may not be known to the original source.

Figure 12:
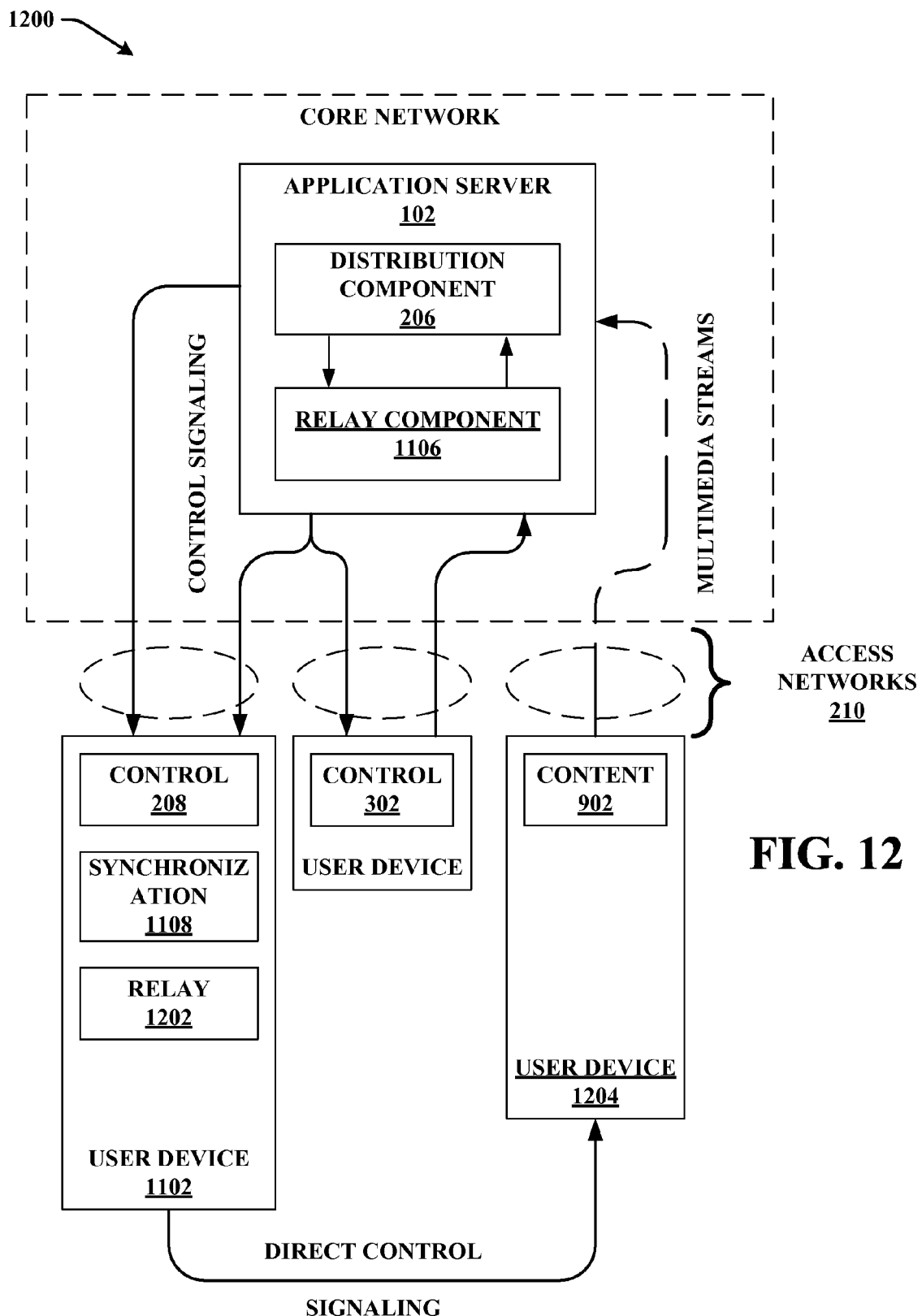
FIG. 12 illustrates a system that initiates, transfers, manipulates, and/or allows for the maintenance of simultaneous real time streaming of multimedia content between a disparity of devices in accordance with one or more aspects of the claimed subject matter.

FIG. 12 provides depiction of a system 1200 that initiates, transfers, manipulates, and/or allows for the maintenance of simultaneous real time streaming of multimedia content between a disparity of devices in accordance with one or more aspects of the claimed subject matter. Once again as a continuation of the ongoing illustration with regard to Jane, in this scenario Jane is sharing content from a digital video recorder (DVR) situated in her home. Thus, she can use her cell phone (e.g., user device 1102) to directly control the digital video recorder (DVR) (e.g., user device 1204) using a Bluetooth radio interface, for example, and thereafter Jane can share control with her friends and family. The configuration provided in FIG. 12 illustrates the fact that if content is provided from a directly controlled device that does not have a core network control signaling relationship (e.g., user device 1204), then shared control must be established through a synchronization function (e.g., synchronization aspect 1108) associated with the device (user device 1102) with the content control relationship (e.g., between user device 1102 and user device 1204 where user device 1102 provides direct control signaling to user device 1204).

Figure 13:
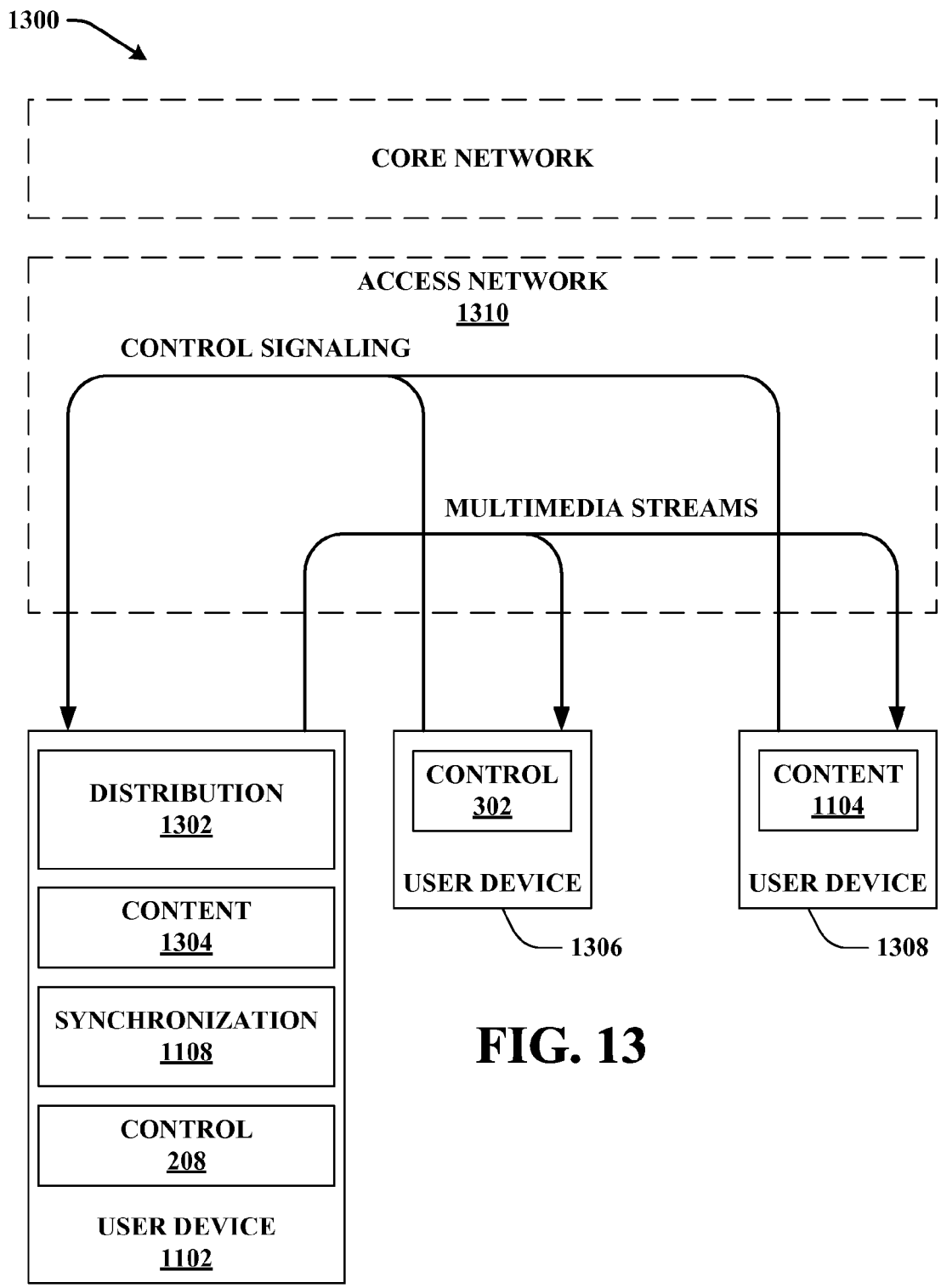
FIG. 13 illustrates a system that provides for the initiation, transfer, manipulation, and/or maintenance of simultaneous real time streaming of content between diverse devices in accordance with an aspect of the claimed matter.

FIG. 13 illustrates a system 1300 that provides for the initiation, transfer, manipulation, and/or maintenance of simultaneous real time streaming of content between diverse devices in accordance with an aspect of the claimed matter. Here the situation is that Jane has chicken pox and is quarantined in her bedroom. Nevertheless, our redoubtable and irrepressible Jane wants to share a video she has on her cell phone (e.g., user device 1102) with the rest of her family. In this instance observation dictates that the best quality of service (QoS) can be achieved through utilization of the local home network (e.g., access network 1310), for example, thereby circumventing utilization of the core network. Thus Jane, while recuperating from her bout of chicken pox in her bedroom, can watch the shared video on a wall mounted television in her bedroom (e.g., user device 1306) while the rest of her family can view the video on a high definition television (e.g., user device 1308) in the living room. As illustrated, all the functionality (e.g., distribution, synchronization, control, and provision of the shared content) can be carried out by Jane's cell phone (e.g., user device 1102), and more particularly, by distribution aspect 1302, synchronization aspect 1108, control feature 208, and content provisioning aspect 1304). It should be noted, without limitation or loss of generality, in connection with this aspect of the claimed subject matter that the devices (e.g., user device 1102, user device 1306, and user device 1308) are all intercommunicating via a common access network 1310 (e.g., a home network).

Figure 14:
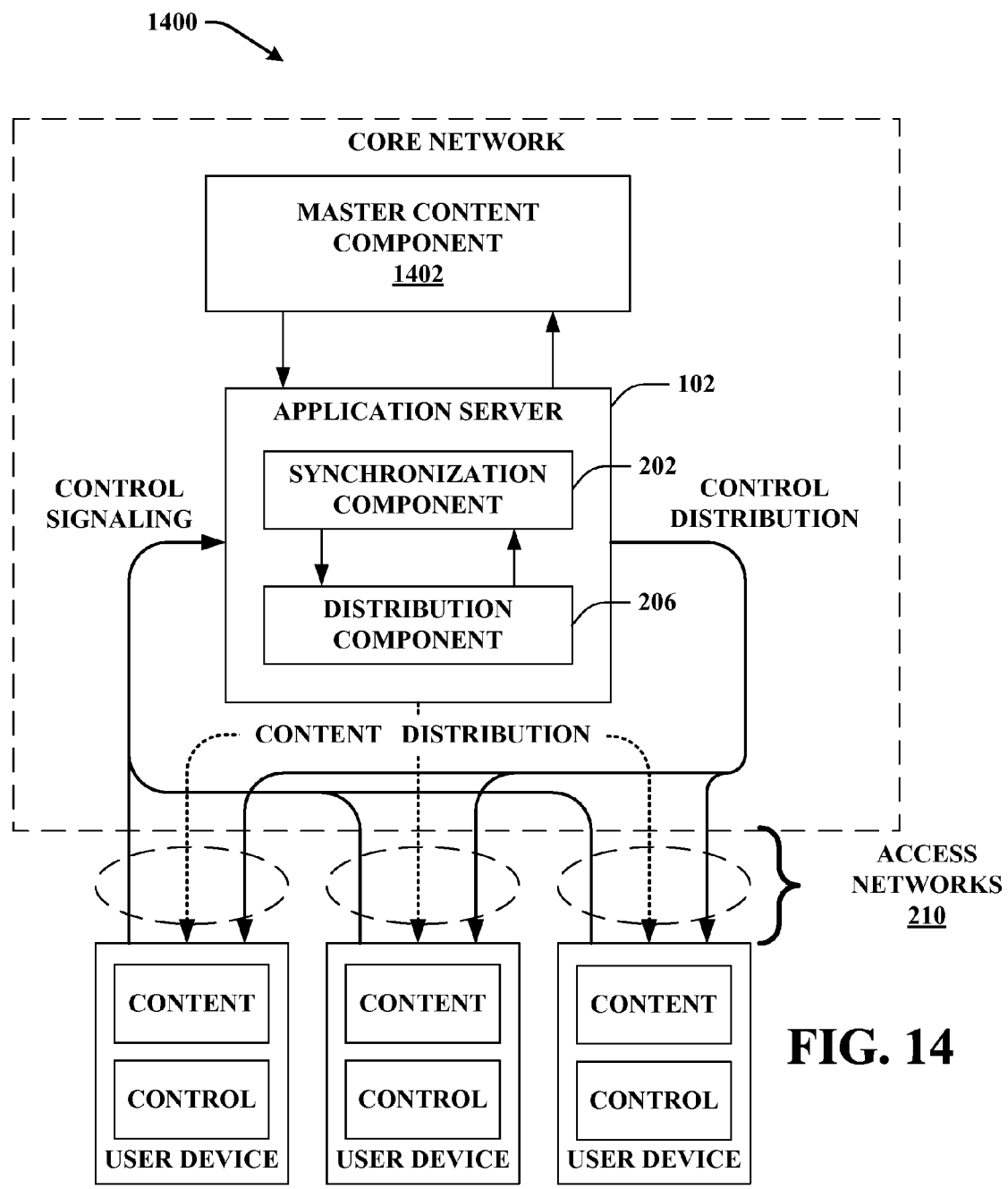
FIG. 14 illustrates a further system implemented on a machine that initiates, transfers, manipulates, and/or allows for the maintenance of simultaneous real time streaming of multimedia content between various disparate devices in accordance with an aspect of the claimed subject matter.

FIG. 14 depicts a further system 1400 that initiates, transfers, manipulates, and/or allows for the maintenance of simultaneous real time streaming of multimedia content between various disparate devices in accordance with an aspect of the claimed subject matter. This depiction illustrates how content can be distributed prior to consumption by a master content component 1402 in conjunction with application server 102 (e.g., through the facilities of distribution component 206) to a disparity of user devices, and thereafter the distributed content can be provided locally from each of the user devices with centralized synchronization control provided by synchronization component 202. In such a manner, the lag that can be extant in access networks, or across networks, or core networks, and be reduced and/or mitigated.

Figure 15:
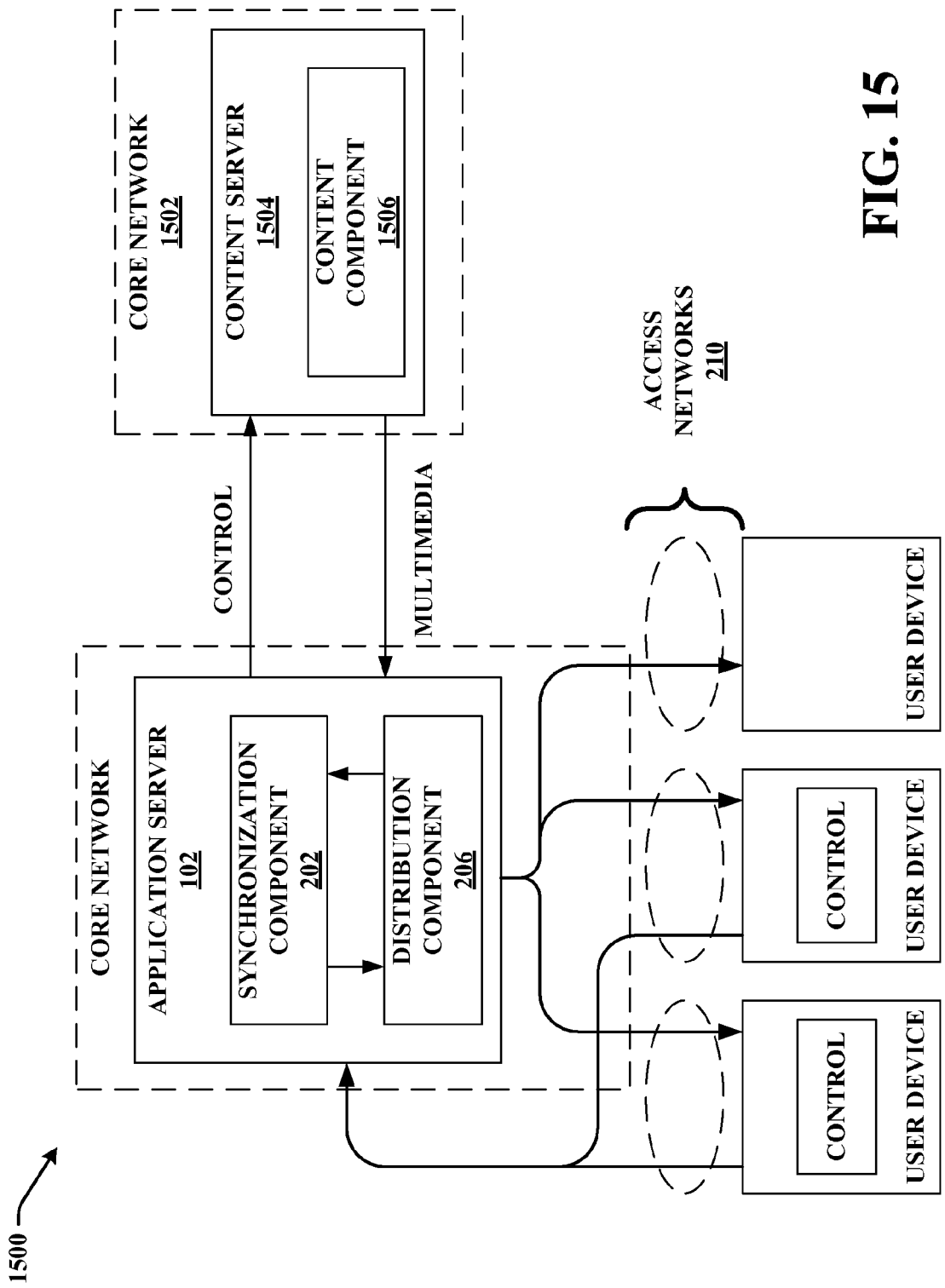
FIG. 15 illustrates a system implemented on a machine that provides for the initiation, transfer, manipulation, and/or maintenance of simultaneous real time streaming of content between diverse devices in accordance with an aspect of the claimed matter.

FIG. 15 illustrates a system 1500 that provides for the initiation, transfer, manipulation, and/or maintenance of simultaneous real time streaming of content between diverse devices in accordance with an aspect of the claimed matter. System 1500 illustrates content from content component 1506 being supplied from a content server 1504 situated in a disparate or distinct core network 1502 (e.g., a core network other than the one that provides the control and distribution functions). Moreover FIG. 15 illustrates the distribution of the various functionalities across different core networks, access networks (e.g., access networks 210), and various disparate user devices. Furthermore, as depicted in FIG. 15 and as will be appreciated by those of moderate skill in the art, control signaling and data transmission can be required between core networks.

Figure 16:
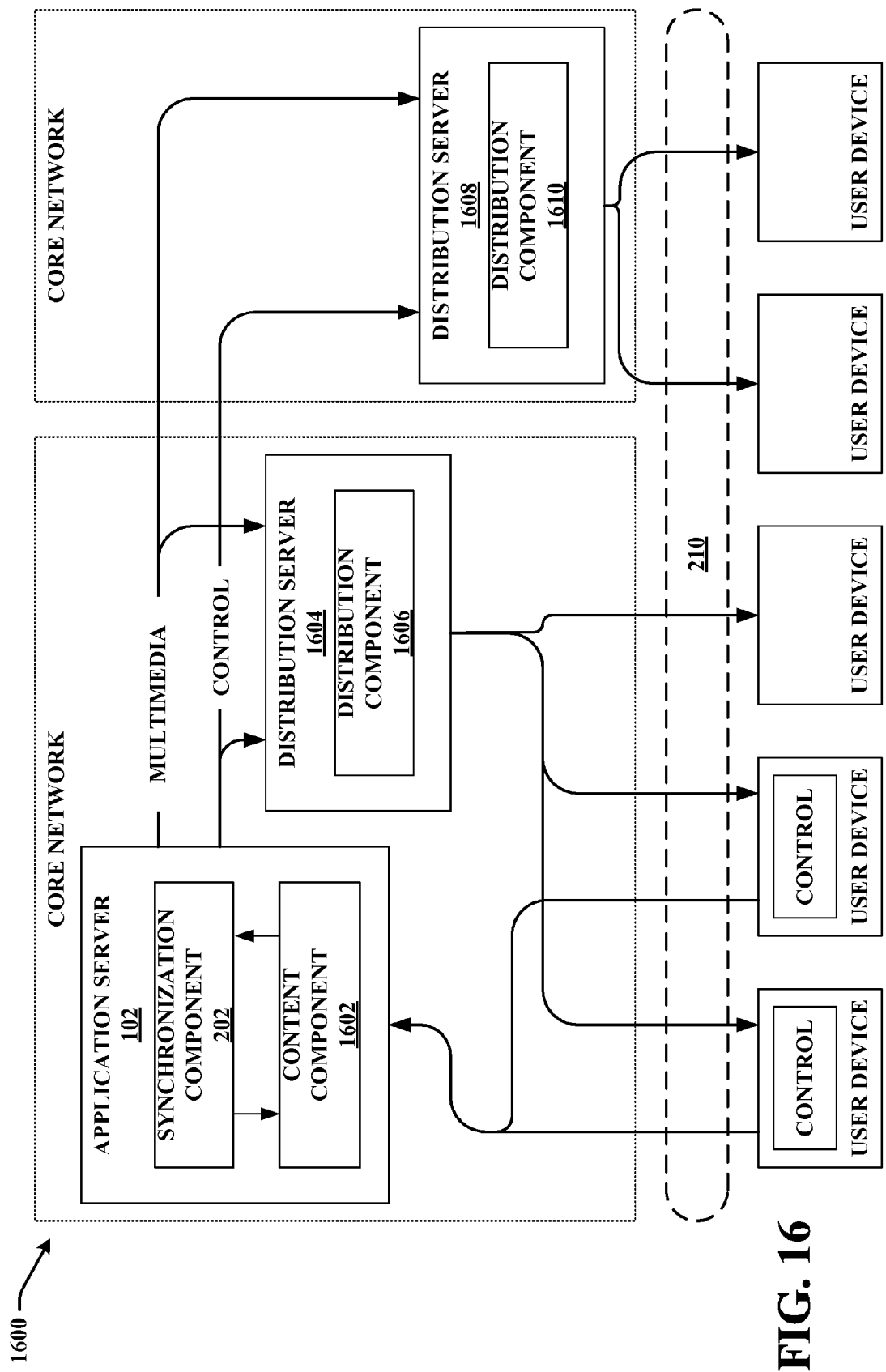
FIG. 16 illustrates a machine implemented system that provides for the initiation, transfer, manipulation, and/or maintenance of simultaneous real time streaming of content between diverse devices in accordance with an aspect of the claimed matter.

FIG. 16 depicts a system 1600 that provides for the initiation, transfer, manipulation, and/or maintenance of simultaneous real time streaming of content between diverse devices in accordance with an aspect of the claimed matter. More particularly, FIG. 16 illustrates the aspect of multiple distribution servers dispersed over separate core networks. The aspect of multiple distribution servers dispersed over separate and/or distinct core networks can be utilized to provide increased performance. As illustrated system 1600, in addition to application server 102 and its associated synchronization and/or content capabilities provided by synchronization component 202 and/or content component 1602 respectively, can include distribution server 1604 and associated distribution component 1606 as well as distribution server 1608 together with its associated distribution component 1610. As will be observed from perusal of FIG. 16, distribution server 1604 can be co-located on the same core network as application server 102 whereas distribution server 1608 can be situated in a disparate and/or distinct core network. Moreover, as will be appreciated by those of moderate skill in the art there can be multiple controlling devices which can be attached via access networks 210 (e.g., multiple multifarious access networks) to the core network(s) which can provide synchronization and other functionality for the streaming of multimedia content to the various and geographically dispersed user devices. For example, and as presented in FIG. 16, controlling devices can be accommodated in a separate core network (e.g., those on the right side of the figure) by providing relay functionality in the core network to which they are attached, nevertheless, as will be appreciated by those with a basic understanding in this field of endeavor, the claimed subject matter is not so limited.

In addition to the foregoing elucidated components and functionalities the claimed subject matter can include storage or persistence facilities such as storage devices that can include any suitable data necessary for claimed subject matter in any of its various configurations to facilitate it aims. For instance, such storage devices can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate networks, activity across a network, credit card In view of the illustrative systems shown and described supra, methodologies that may be implemented in accordance with the disclosed subject matter will be better appreciated with reference to the flow chart of FIG. 17. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

Figure 17:
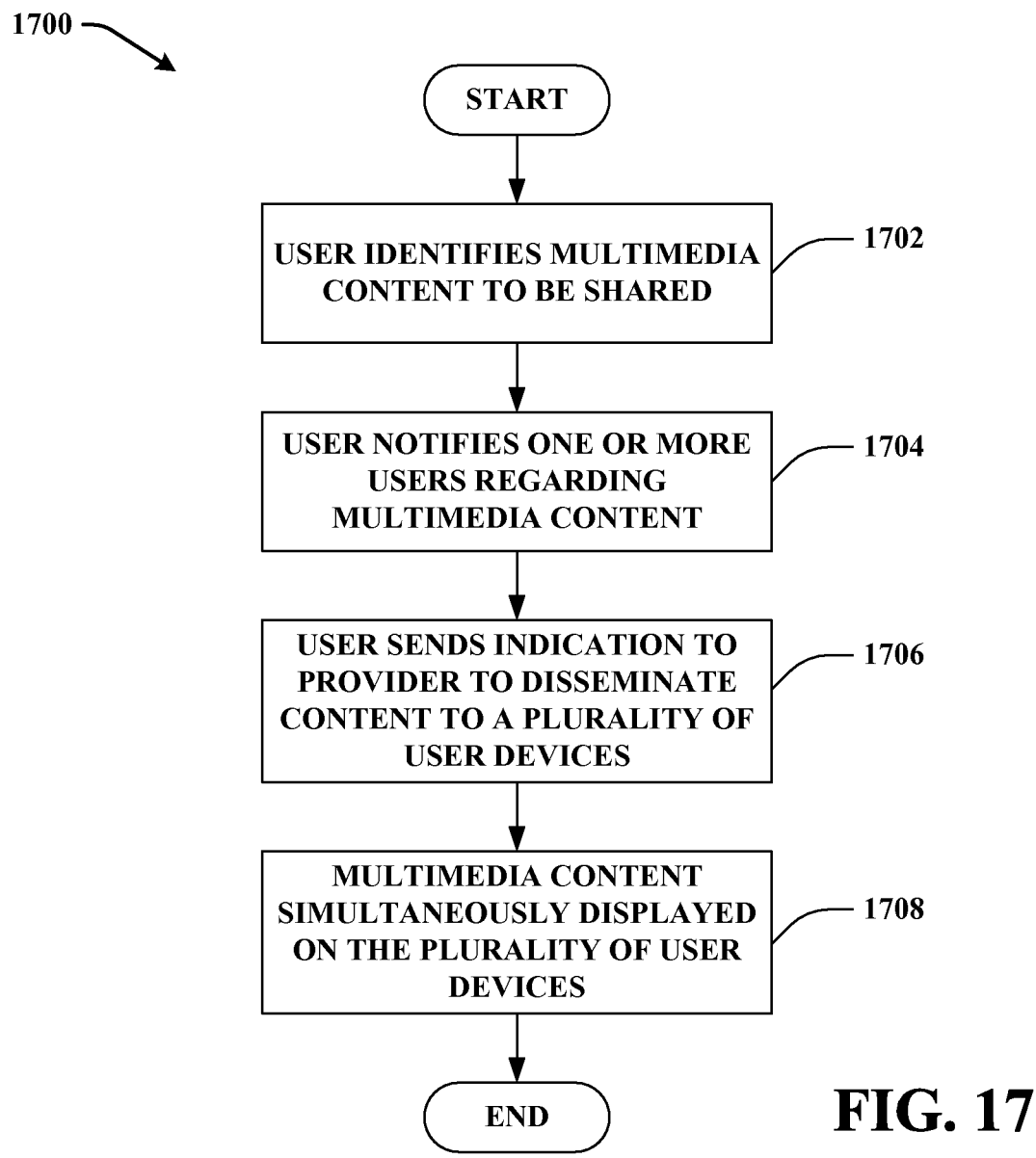
FIG. 17 illustrates a flow diagram of a machine implemented methodology that facilitates and/or effectuates the initiation, transfer, manipulation, and/or maintenance of simultaneous real time streaming of multimedia content between a wide disparity of devices in accordance with various aspects of the claimed matter.

FIG. 17 provides illustration of a basic methodology 1700 that can be utilized to initiate, transfer, manipulate, and/or maintain the simultaneous real time streaming of content between diverse devices in accordance with an aspect of the claimed matter. Method 1700 can commence at 1702 where a user, utilizing a mobile device, such as a cell phone or multimedia Internet enabled phone, identifies multimedia content that he/she wishes to share on a application server situated in a core network. At 1704 the user on discovery of the multimedia content can notify one or more users regarding the fact that he/she has found content that would be of interest to the one or more users. At 1706 the user can employ his/her mobile device to provide indication to the application server (or service) located on the core network to commence simultaneously distributing or disseminating the content to a plurality of disparate user devices, such as high definition televisions, the mobile device that initiated the dissemination, other mobile devices, legacy devices (e.g., speaker phones), and the like. At 1708 the distributed multimedia content can be presented on the various devices to which the content has been simultaneously distributed. For example, where a device is capable of displaying the multimedia content the content can be displayed. On the other hand, where a device is incapable of appropriately presenting the multimedia content a constrained facsimile can be presented. For instance in the case of a legacy speaker phone that does not have a display capability, the audio portion of the multimedia content can be supplied and perceived by the user.

From the foregoing discussion and description of the various components presented, it will be comprehended by those of ordinary skill in the art that the claimed subject matter provides components and/or methods that can be flexibly interworked to provide the needed functionality in a variety of communication component configurations. In accordance with one or more aspects of the claimed subject matter, systems and/or methods are presented that enable core network server based media synchronization, supporting one or more media streams to one or more user devices, and supporting media control by one or more user devices. To facilitate the foregoing, and in particular the synchronized delivery of multimedia to multiple devices, media streams can be provided to the one or more user devices, user devices with a control function can intercommunicate with a core network server to establish and control media streams, and the core network server can provide a media synchronization function that enables the same real time media experience by the (multiple) users of the (multiple) devices.

Additionally, the media synchronization functionality can be provided in a standalone server dedicated to this function, or in a server providing additional functionality (e.g., content, content distribution, etc.), however, where core network based functions are provided in separate servers (e.g., with different component/function relationships) then additional control and data signaling can be required between the servers as illustrated in the FIGs. above. Moreover, a media session establishment request can request the establishment of one or more streaming sessions to one or more devices using industry standard signaling mechanisms (e.g., session initiation protocol (SIP)), and subsequent streaming media session establishment requests can be provided after the original streaming media establishment request.

Furthermore, streaming sessions can be established between the server and one or more devices with a control function, such streaming sessions can be referred to as a locally controlled media stream, or one or more devices without a control function which can be referred to as remotely controlled media streams. Locally controlled media streams and remotely controlled media streams can be synchronized to provide the same real time experience for users (e.g., control commands issued by either a device with shared control or a device with exclusive control can be equally applied to local and remote streams).

To further facilitate and/or effectuate the claimed subject matter separate signaling methods can be provided for session and media control from controlling devices and the synchronization function(s) can arbitrate between potentially conflicting conflicts (e.g., one user sends a PAUSE command, and another user sends a PLAY command very shortly thereafter). Arbitration can take into consideration user priority levels (e.g., a first device has priority over a second device) and timing of received commands (e.g., ignore a command received within 1 second of a previous command, etc.).

Furthermore, in order to effectuate and/or facilitate control across multiple devices in accordance with various aspects of the claimed subject matter, for all of the (flexible) component configurations which collectively enable synchronized delivery of multimedia content to multiple devices, control of the media stream(s) can be provided by a single user device (e.g., exclusive control) or multiple devices (e.g., shared control). Where exclusive control is manifest, it can be transferred from one device to another, for example from the original device which initially established the multimedia session(s) to a different user device; the device receiving the control can then assume the role of a controller device. Moreover, the claimed subject matter provides mechanisms for the arbitration of control among various devices, for example, user/device interaction between the current (exclusive) control device and the user/device requesting the control resulting in transfer of control (e.g., agreement and granting of permission between users to transfer exclusive control). Other arbitration mechanisms can also be provided such as, use of a control token whereby a device requests a control token from the current control device and/or a network entity (e.g. the application server/service controlling the media stream(s)) which can result in transfer of control from the current control device to the device requesting control; when operating with exclusive device control, the system may allow only one control token, thereby restricting the control function to one device (e.g., restricting control to only one user) even if there are multiple devices that have control functions; and when operating with shared device control, the system may allow more than one control token.

Additionally and/or alternatively, if control is restricted to one device (e.g., exclusive control), and multiple devices have a control function, the control function in non-controlling devices can be rendered inactive by disabling the transmission of commands from the non-controlling device(s), or by ignoring the received commands at the synchronization function. It should be noted however, that a device with exclusive control can nevertheless interact with other devices (e.g., via Bluetooth or other means) such that these devices request the server to set up the remote media streams (e.g., under the direct control of the device with exclusive control). Thus, even though a user device may not have control, it may still exchange control signaling with other system components. In this regard it will be appreciated that control signaling and data transmission between the user devices and core network servers (e.g., application server 102) can be provided by one or more common industry standard mechanisms (e.g. protocols such as session initiation protocol (SIP) and/or real time streaming protocol (RTSP)).

Further it should be noted that, a device with a control function can request establishment of media streams to devices without control functions in the original establishment request, or in subsequent requests, providing information necessary for the network to establish the media streaming with such devices, and that, separate signaling methods can be provided for session and media control from controlling devices.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 18:
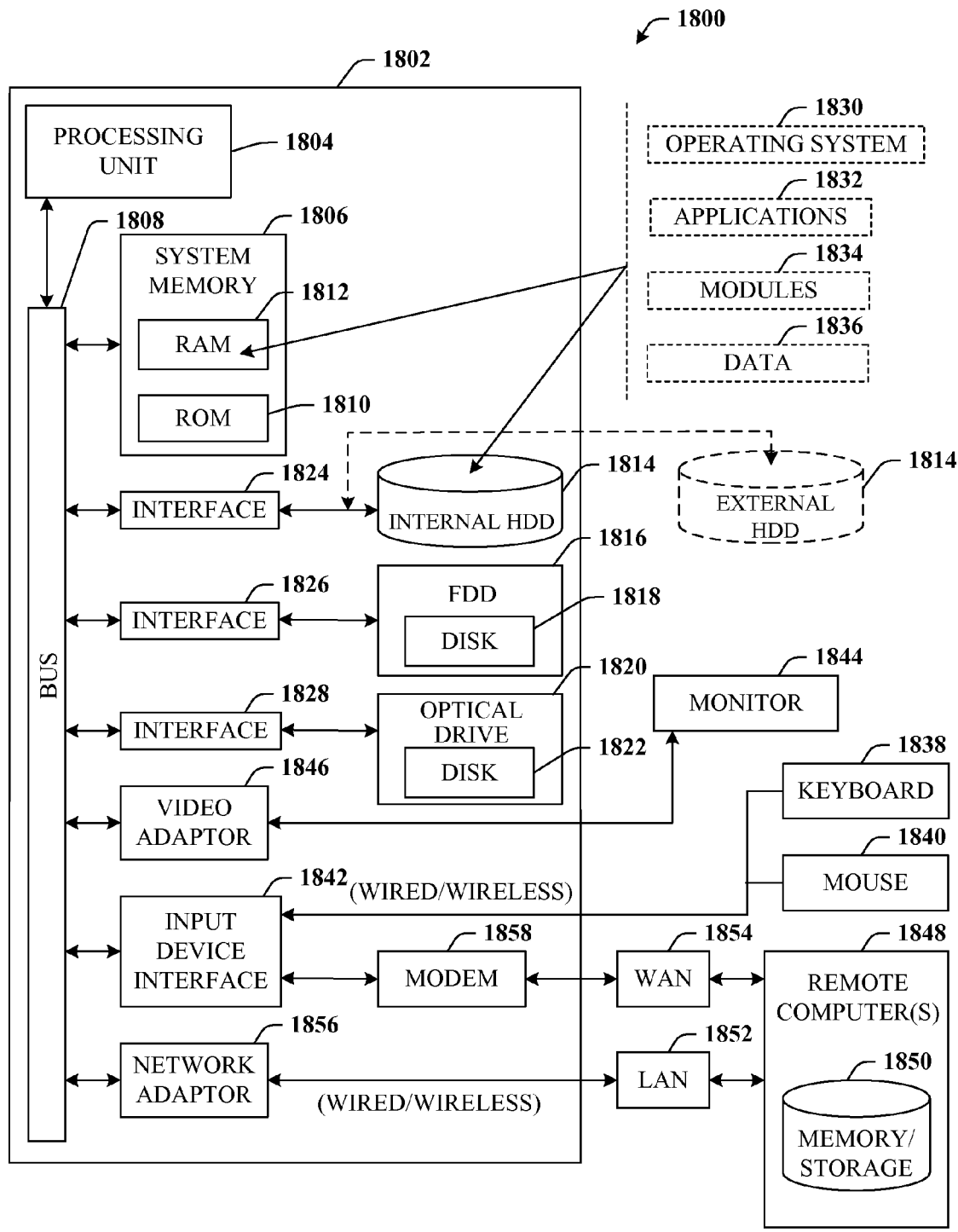
FIG. 18 illustrates a block diagram of a computer operable to execute the disclosed system in accordance with an aspect of the claimed subject matter.

Referring now to FIG. 18, there is illustrated a block diagram of a computer operable to execute the disclosed system. In order to provide additional context for various aspects thereof, FIG. 18 and the following discussion are intended to provide a brief, general description of a suitable computing environment 1800 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 18, the illustrative environment 1800 for implementing various aspects includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures may also be employed as the processing unit 1804.

The system bus 1808 can be any of several types of bus structure that may further interconnect to a memory bus (with or without a memory controller), a peripheral bus, and a local bus using any of a variety of commercially available bus architectures. The system memory 1806 includes read-only memory (ROM) 1810 and random access memory (RAM) 1812. A basic input/output system (BIOS) is stored in a non-volatile memory 1810 such as ROM, EPROM, EEPROM, which BIOS contains the basic routines that help to transfer information between elements within the computer 1802, such as during start-up. The RAM 1812 can also include a high-speed RAM such as static RAM for caching data.

The computer 1802 further includes an internal hard disk drive (HDD) 1814 (e.g., EIDE, SATA), which internal hard disk drive 1814 may also be configured for external use in a suitable chassis (not shown), a magnetic floppy disk drive (FDD) 1816, (e.g., to read from or write to a removable diskette 1818) and an optical disk drive 1820, (e.g., reading a CD-ROM disk 1822 or, to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface 1828, respectively. The interface 1824 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed and claimed subject matter.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. It is to be appreciated that the claimed subject matter can be implemented with various commercially available operating systems or combinations of operating systems.

A user can enter commands and information into the computer 1802 through one or more wired/wireless input devices, e.g., a keyboard 1838 and a pointing device, such as a mouse 1840. Other input devices (not shown) may include a microphone, an IR remote control, a joystick, a game pad, a stylus pen, touch screen, or the like. These and other input devices are often connected to the processing unit 1804 through an input device interface 1842 that is coupled to the system bus 1808, but can be connected by other interfaces, such as a parallel port, an IEEE 1094 serial port, a game port, a USB port, an IR interface, etc.

A monitor 1844 or other type of display device is also connected to the system bus 1808 via an interface, such as a video adapter 1846. In addition to the monitor 1844, a computer typically includes other peripheral output devices (not shown), such as speakers, printers, etc.

The computer 1802 may operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which may connect to a global communications network, e.g., the Internet.

When used in a LAN networking environment, the computer 1802 is connected to the local network 1852 through a wired and/or wireless communication network interface or adapter 1856. The adaptor 1856 may facilitate wired or wireless communication to the LAN 1852, which may also include a wireless access point disposed thereon for communicating with the wireless adaptor 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wired or wireless device, is connected to the system bus 1808 via the serial port interface 1842. In a networked environment, program modules depicted relative to the computer 1802, or portions thereof, can be stored in the remote memory/storage device 1850. It will be appreciated that the network connections shown are illustrative and other means of establishing a communications link between the computers can be used.

The computer 1802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a memory to store executable instructions; and
    a processor, coupled to the memory, that facilitates execution of the executable instructions to perform operations, comprising:
        receiving, from a first device, selection data representing a set of devices to which multimedia content is to be streamed, wherein the set of devices comprises the first device and the devices of the set of devices are configured to play the multimedia content;
        receiving, from the first device, a command to initiate synchronized playback of the multimedia content by the set of devices;
        synchronizing distribution of media streams comprising the multimedia content to the devices of the set of devices;
        receiving, from at least two devices of the set of devices, at least two other commands, respectively, to control the synchronized playback of the multimedia content by the set of devices;
        arbitrating a conflict determined to have arisen between the at least two other commands in response to receiving the at least two other commands within a predetermined window of time; and
        directing control of the synchronized playback of the multimedia content by the set of devices comprising applying the at least two other commands to the media streams based on a resolution of the arbitrating.

2. The system of claim 1, wherein the system is an application server of a cellular network that establishes and supports the control of the synchronized playback of the multimedia content.

3. The system of claim 1, wherein the devices of the set of devices communicate with the system via different network devices of different access networks to actuate the synchronizing of the distribution, and to communicate the at least two other commands to the system.

4. The system of claim 1, wherein the synchronizing comprises, in response to the receiving the command, setting up a streaming media session between a source of the multimedia content and the devices to effectuate synchronized streaming of the media streams to the devices.

5. The system of claim 1, wherein the arbitrating comprises assigning a priority for the applying of one of the at least two other commands based on an order of receipt of the at least two other commands.

6. The system of claim 1, wherein the arbitrating comprises assigning a priority for the applying of one of the at least two other commands based on priority levels respectively associated with the at least two devices from which the at least two other commands were received.

7. The system of claim 6, wherein the arbitrating comprises assigning a priority for the applying of one of the at least two other commands based on priority levels respectively associated with the at least two other commands.

8. The system of claim 1, wherein the media streams respectively comprise different media components of the multimedia content and the synchronizing further comprises synchronizing distribution of the different media components of the multimedia content to different devices of the set of devices.

9. The system of claim 8, wherein the different devices of the set of devices have different multimedia capabilities and are configured to play the different media components of the multimedia content as a function of the different multimedia capabilities, and wherein the different multimedia components comprise audio and video components.

10. The system of claim 1, wherein a first media stream of the media streams comprises an audio component and a second media steam of the media streams comprises a video component, and wherein the synchronizing the distribution further comprises synchronizing distribution of the first media stream to a first device of the set of devices configured to play the audio component and the second media stream to a second device of the set of devices configured to play the video component.

11. A method, comprising:
receiving, by a system comprising a processor, a command from a device of a set of devices to initiate synchronized playback of multimedia content by the set of devices, wherein the devices of the set of devices are configured to play the multimedia content;
synchronizing, by the system, distribution of media streams comprising the multimedia content to the devices of the set of devices;
receiving, by the system, from devices of the set of devices, other commands, respectively, to control the synchronized playback of the multimedia content by the set of devices;
arbitrating a conflict determined to have arisen between the other commands in response to receiving the other commands within a predetermined window of time; and
directing, by the system, control of the synchronized playback of the multimedia content by the set of devices comprising applying the other commands to the media streams based on an outcome of the arbitrating.

12. The method of claim 11, wherein the other commands comprises a pause command to pause the synchronized playback of the multimedia content.

13. The method of claim 11, wherein the wherein the arbitrating comprises assigning a priority for the applying of one of the other commands based on an order of receipt of the other commands.

14. The method of claim 11, wherein the arbitrating comprises assigning a priority for the applying of one of the other commands based on priority levels respectively associated with the devices from which the other commands were received.

15. The method of claim 11, wherein one device of the devices is permitted to issue one of the other commands at a time.

16. The method of claim 15, further comprising, transferring, by the system, a control token that enables the devices to communicate the other commands from a first device of the devices to a second device of the devices.

17. The method of claim 11, wherein the arbitrating comprises assigning a priority for the applying of one of the second commands based on priority levels respectively associated with the second commands.

18. The method of claim 11, wherein a first media stream of the media streams comprises an audio component and a second media steam of the media streams comprises a video component, and wherein the synchronizing the distribution further comprises synchronizing distribution of the first media stream to a first device of the set of devices configured to play the audio component and the second media stream to a second device of the set of devices configured to play the video component.

19. A computer readable storage device comprising computer executable instructions that, in response to execution, cause a system to perform operations, comprising:
receiving a first command from a first device of a set of devices to initiate synchronized playback of multimedia content by the set of devices, wherein the set of devices are configured to play the multimedia content;
synchronizing distribution of media streams comprising the multimedia content to the set of devices;
receiving, from the set of devices, second commands to control the synchronized playback of the multimedia content by the set of devices;
arbitrating a conflict arising between the second commands in response to determination that the conflict is present and in response to receiving the second commands within a predetermined window of time; and
directing control of the synchronized playback of the multimedia content by the set of devices by applying the second commands to the media streams based on a resolution of the arbitrating.

20. The computer readable storage device of claim 19, wherein the synchronizing comprises, in response to the receiving the first command, setting up a streaming media session between a source of the multimedia content and the set of devices to effectuate synchronized streaming of the media streams to the set of devices.

21. The computer readable storage device of claim 19, wherein the arbitrating comprises assigning a priority for the applying of one of the second commands based on an order of receipt of the second commands.

22. The computer readable storage device of claim 19, wherein the arbitrating comprises assigning a priority for the applying of one of the second commands based on priority levels respectively associated with the set of devices from which the second commands were received.

23. The computer readable storage device of claim 19, wherein the arbitrating comprises assigning a priority for the applying of one of the second commands based on priority levels respectively associated with the second commands.

24. The computer readable storage device of claim 19, wherein a first media stream of the media streams comprises an audio component and a second media steam of the media streams comprises a video component, and wherein the synchronizing the distribution further comprises synchronizing distribution of the first media stream to a first device of the set of devices configured to play the audio component and the second media stream to a second device of the set of devices configured to play the video component.

* * * * *